United States Patent
Filgas et al.

(10) Patent No.: US 7,065,121 B2
(45) Date of Patent: Jun. 20, 2006

(54) WAVEGUIDE ARCHITECTURE, WAVEGUIDE DEVICES FOR LASER PROCESSING AND BEAM CONTROL, AND LASER PROCESSING APPLICATIONS

(75) Inventors: David M. Filgas, Newbury Park, CA (US); Frank Haran, Carp (CA); Andreas Mank, Kanata (CA); John Robertson, Salem, NH (US)

(73) Assignee: GSI Group Ltd., Warwickshire (GB)

( * ) Notice: Subject to any disclaimer, the term of this patent is extended or adjusted under 35 U.S.C. 154(b) by 173 days.

(21) Appl. No.: 10/293,760

(22) Filed: Nov. 13, 2002

(65) Prior Publication Data

US 2003/0161375 A1 Aug. 28, 2003

Related U.S. Application Data

(63) Continuation-in-part of application No. 09/912,214, filed on Jul. 24, 2001, now Pat. No. 6,785,304.

(60) Provisional application No. 60/338,125, filed on Nov. 13, 2001.

(51) Int. Cl.
*H01S 3/11* (2006.01)
*H01S 3/113* (2006.01)
*H01S 3/115* (2006.01)
*H01S 3/03* (2006.01)

(52) U.S. Cl. ............... 372/64; 372/10; 372/11; 372/12

(58) Field of Classification Search .......... 372/66, 372/64, 69, 70, 35, 10, 11, 12, 17, 26, 27, 372/43, 50, 34

See application file for complete search history.

(56) References Cited

U.S. PATENT DOCUMENTS

| | | | |
|---|---|---|---|
| 3,946,128 A | 3/1976 | Spanoudis | |
| 4,057,770 A | 11/1977 | Henningsen et al. | |
| 4,503,541 A | * | 3/1985 | Weller et al. ............ 372/50 |
| 4,617,669 A | 10/1986 | Kuhn | |
| 4,742,523 A | 5/1988 | Fletcher | |
| 4,809,256 A | * | 2/1989 | Smith et al. ............ 398/102 |
| 4,849,036 A | 7/1989 | Powell et al. | |
| 4,860,296 A | 8/1989 | Chemla et al. | |
| 4,918,703 A | 4/1990 | Kukla | |
| 4,924,474 A | 5/1990 | Yagi et al. | |
| 5,084,888 A | 1/1992 | Tajima et al. | |

(Continued)

FOREIGN PATENT DOCUMENTS

EP    000973236 A2  *  1/1999

(Continued)

OTHER PUBLICATIONS

Beach et al, Continuous-wave and passively Q-switched cladding-pumped planar waveguide lasers, Optics Letters, Jun. 15, 2001, vol. 26, No. 12, pp. 881-883.*

(Continued)

*Primary Examiner*—Armando Rodriquez
(74) *Attorney, Agent, or Firm*—Brooks Kushman P.C.

(57) ABSTRACT

Methods and systems for laser-based processing of materials are disclosed wherein a scalable laser architecture, based on planar waveguide technology, provides for pulsed laser micromachining applications while supporting higher average power applications like laser welding and cutting. Various embodiments relate to improvements in planar waveguide technology which provide for stable operation at high powers with a reduction in spurious outputs and thermal effects. At least one embodiment provides for micromachining with pulsewidths in the range of femtoseconds to nanoseconds. In another embodiment, 100 W or greater average output power operation is provided for with a diode-pumped, planar waveguide architecture.

2 Claims, 14 Drawing Sheets

U.S. PATENT DOCUMENTS

| | | | |
|---|---|---|---|
| 5,117,436 A | 5/1992 | Hanson | |
| 5,317,585 A | 5/1994 | Gregor | |
| 5,335,237 A * | 8/1994 | Zapata | 372/33 |
| 5,408,480 A | 4/1995 | Hammati | |
| 5,495,494 A | 2/1996 | Molva et al. | |
| 5,563,399 A | 10/1996 | Wang | |
| 5,569,399 A | 10/1996 | Penney et al. | |
| 5,636,053 A | 6/1997 | Pan | |
| 5,673,284 A * | 9/1997 | Congdon et al. | 372/50 |
| 5,818,630 A | 10/1998 | Fermann et al. | |
| 5,825,525 A * | 10/1998 | Harwit | 359/248 |
| 5,852,622 A | 12/1998 | Meissner et al. | |
| 6,002,695 A | 12/1999 | Alfrey et al. | |
| 6,141,475 A | 10/2000 | Lawrence et al. | |
| 6,160,824 A | 12/2000 | Meissner et al. | |
| 6,163,558 A | 12/2000 | Hiiro | |
| 6,281,471 B1 * | 8/2001 | Smart | 219/121.62 |
| 6,418,156 B1 | 7/2002 | Peressini | |
| 6,647,158 B1 * | 11/2003 | Betts et al. | 385/2 |
| 6,785,304 B1 * | 8/2004 | Filgas | 372/19 |
| 2003/0021324 A1 | 1/2003 | Filgas | |

FOREIGN PATENT DOCUMENTS

| | | |
|---|---|---|
| WO | WO 00/27000 | 5/2000 |
| WO | WO 01/52367 | 7/2001 |

OTHER PUBLICATIONS

Shepherd, D.P., et al., A Diode—Pumped, High Gain, Planar Waveguide, Nd: $Y_3Al_5O_{12}$ Amplifier, University of Southampton, ORC Research Center Review, Aug. 18, 1997.

Beach, R.J., et al., Continuous—Wave And Passively Q-Switched Cladding—Pumped Planar Waveguide Lasers, Maxios Corporation, Livermore, California, Jan. 25, 2001.

* cited by examiner

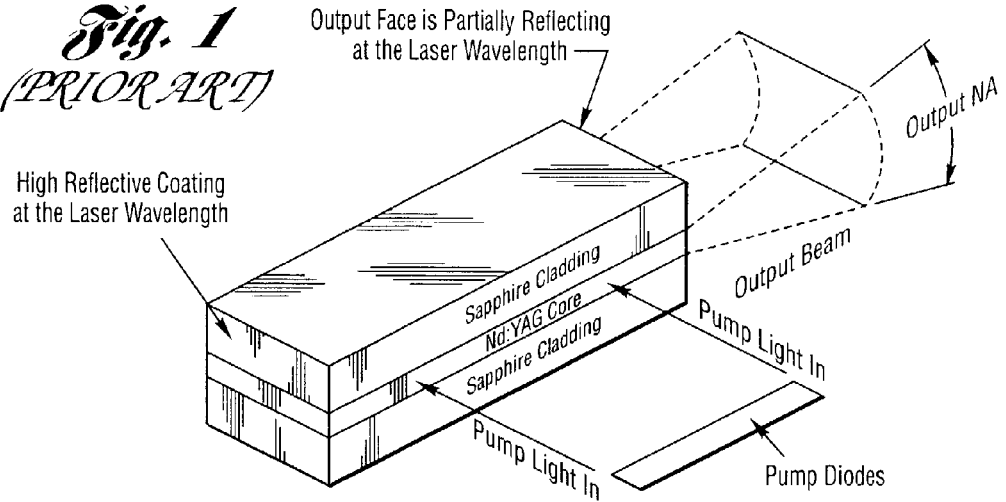
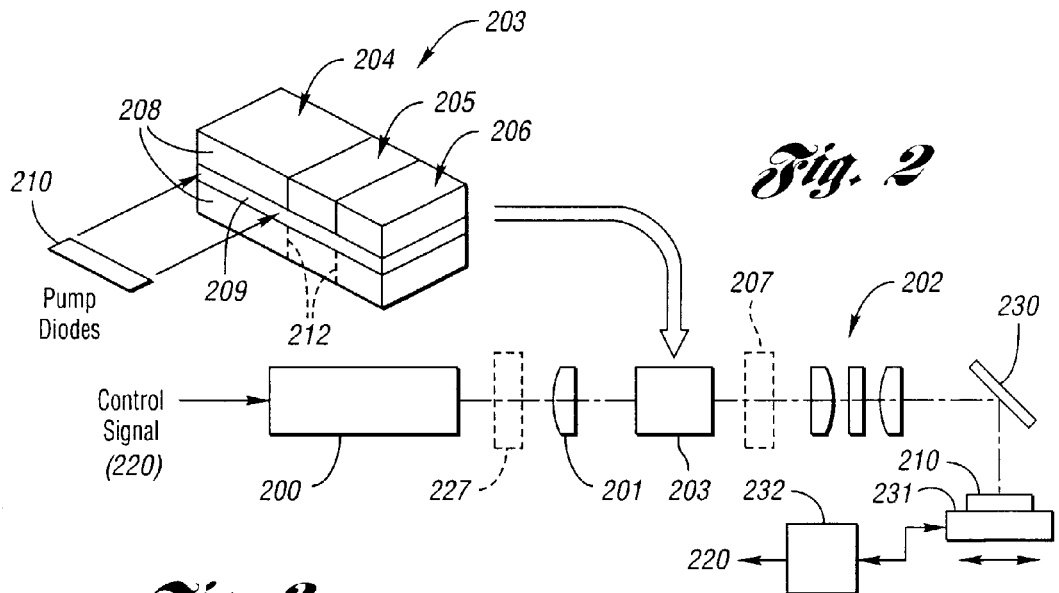
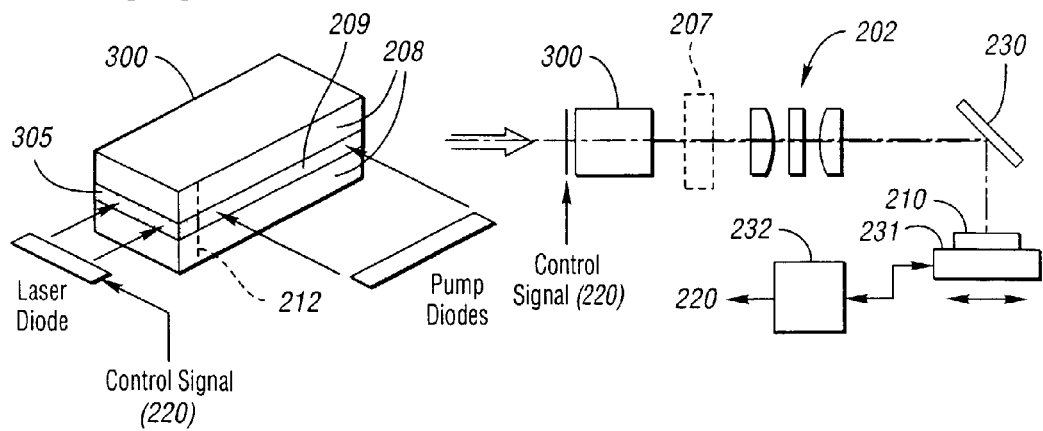

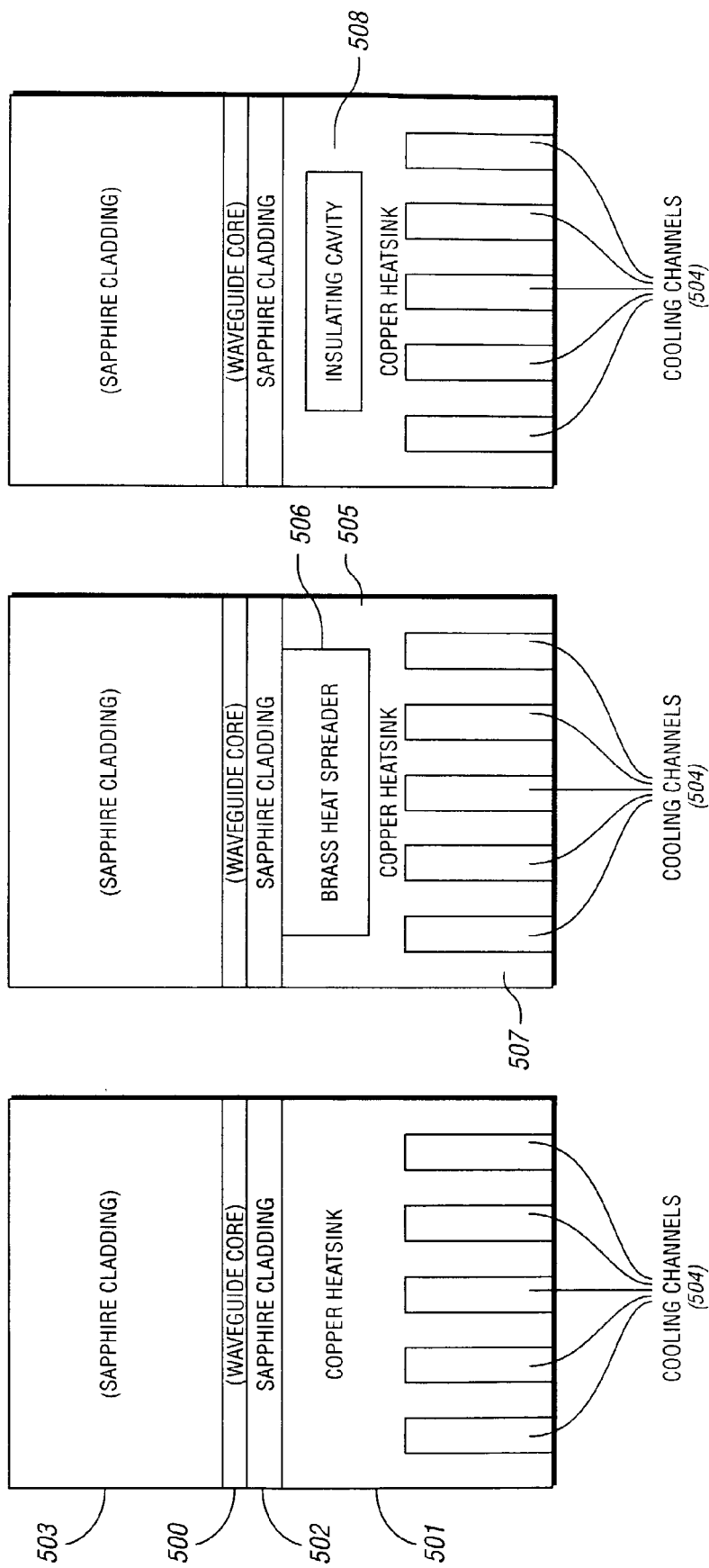

(SIDE-PUMPED PLANAR WAVEGUIDE WITH ZIGZAG BEAM PATH)
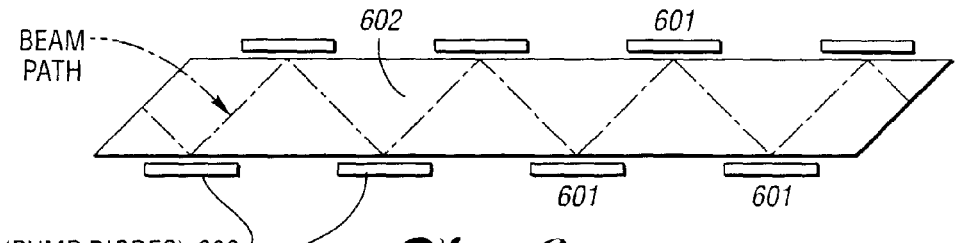
Fig. 6a
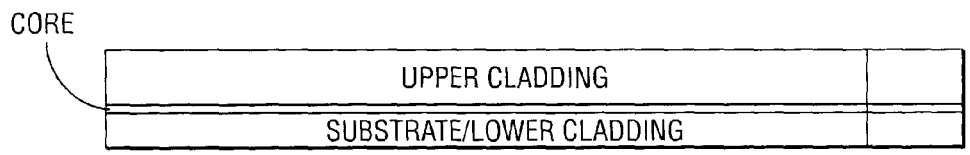
Fig. 6b
Orientation of Uniaxial Crystal   Orientation of Uniaxial Crystal
Axes for ne>ncore>no             Axes for ne<ncore<no
Output is TE polarized           Output is TE polarized
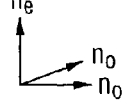 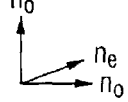
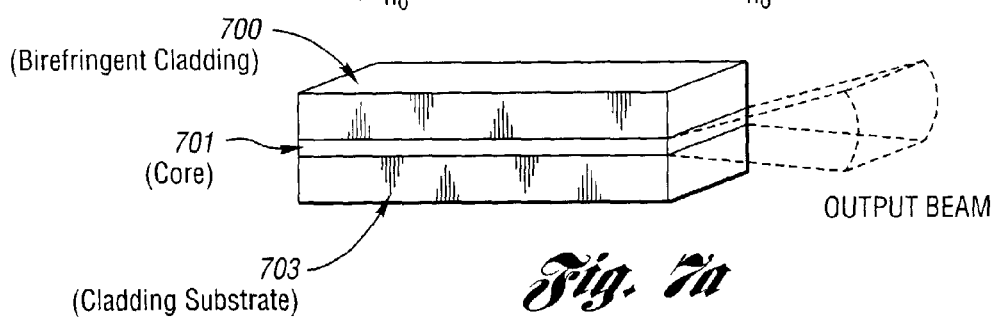
Fig. 7a
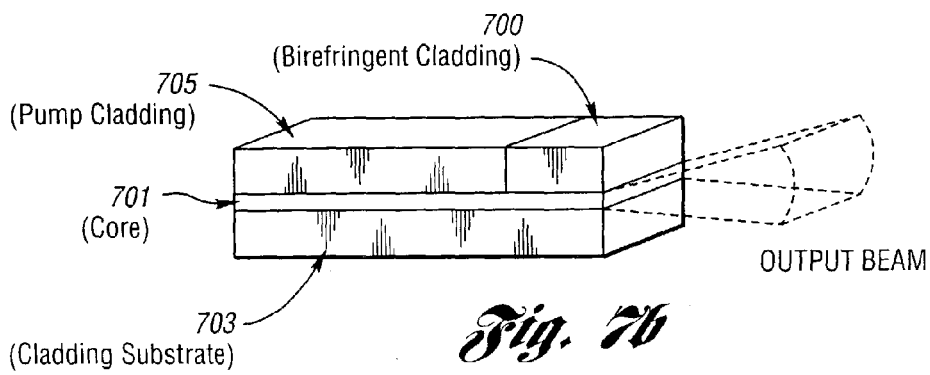
Fig. 7b

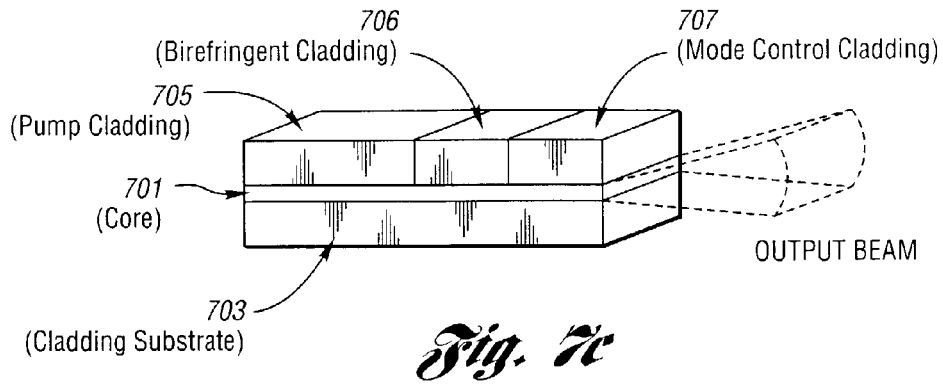
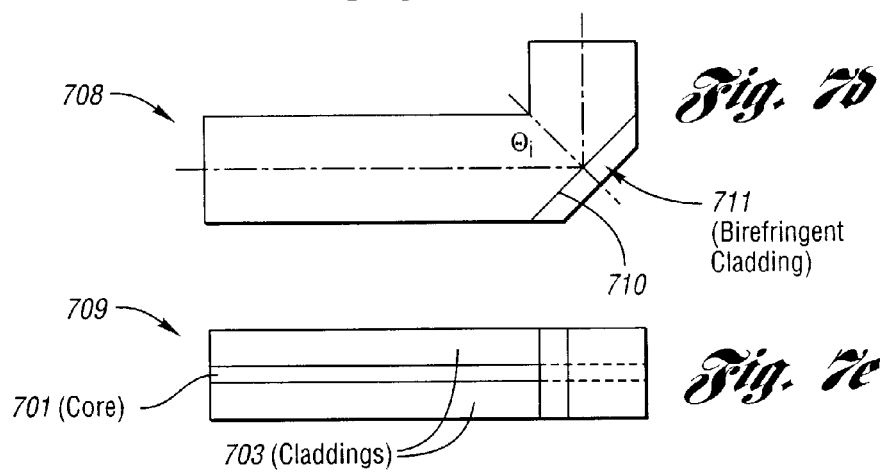
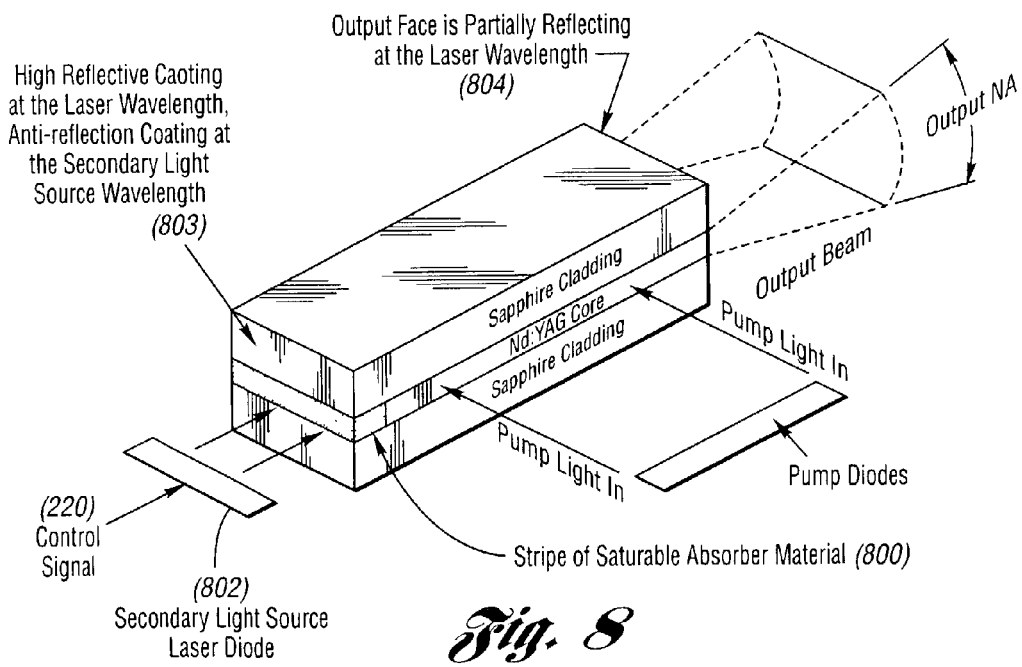

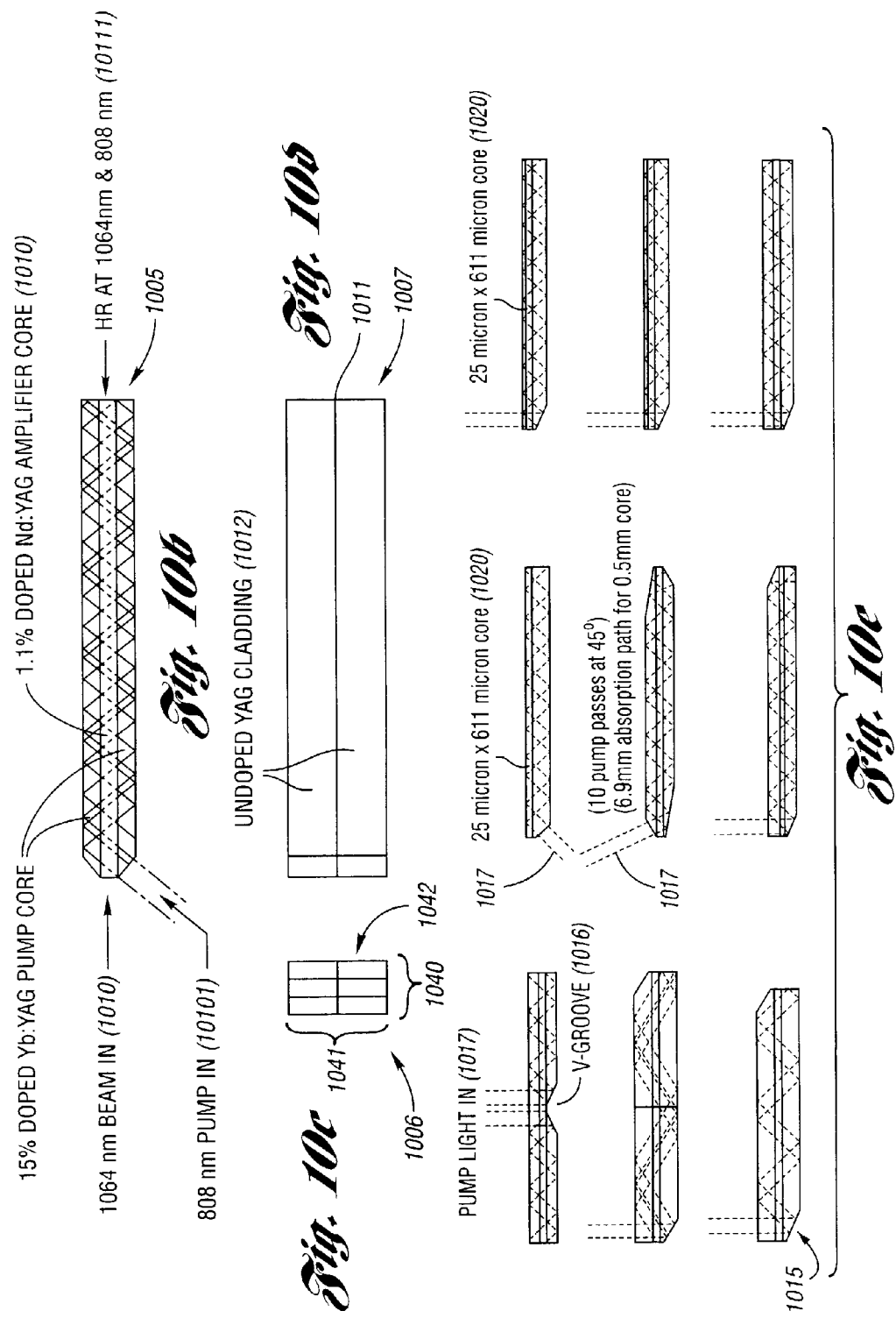

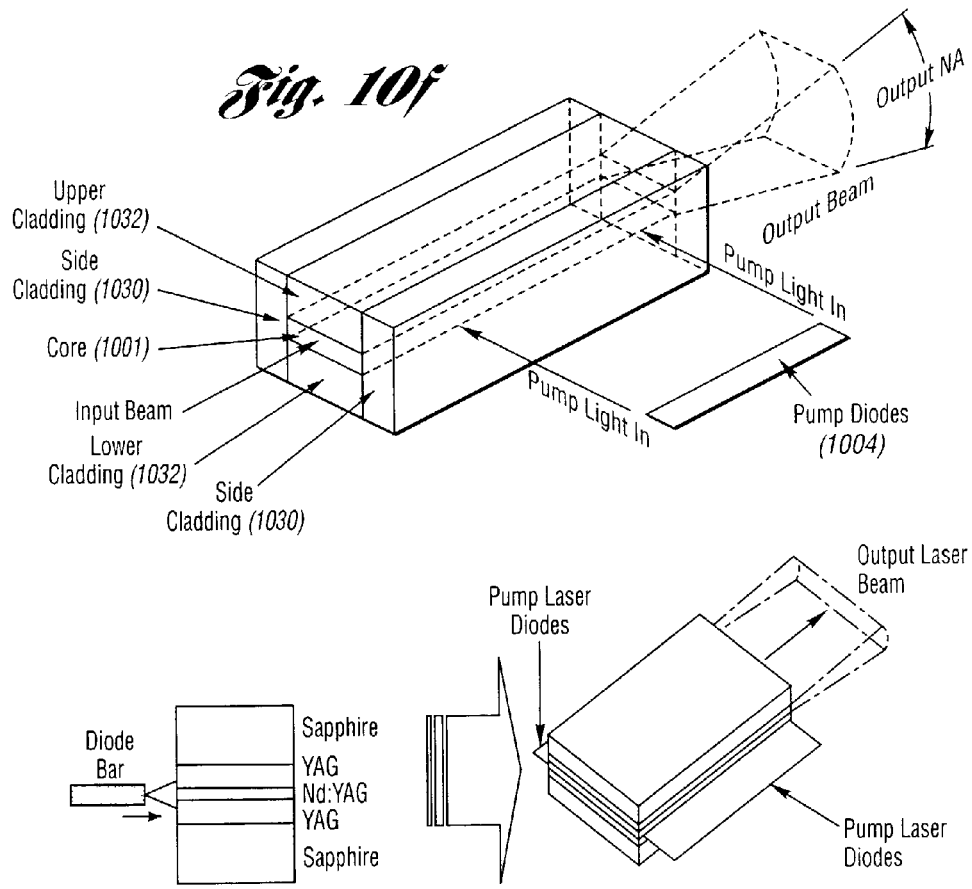
Fig. 10f
Fig. 11a (PRIOR ART)
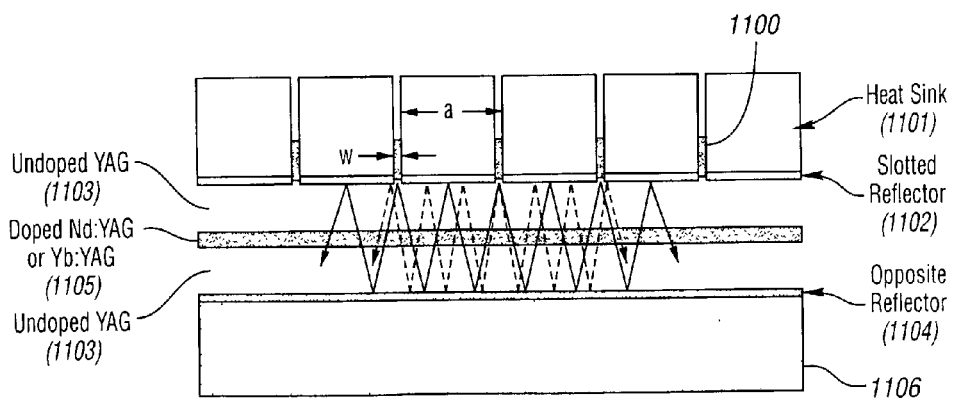
Fig. 11b (PRIOR ART)

WAVEGUIDE ARCHITECTURE, WAVEGUIDE DEVICES FOR LASER PROCESSING AND BEAM CONTROL, AND LASER PROCESSING APPLICATIONS

CROSS-REFERENCE TO RELATED APPLICATIONS

This application is a continuation in part of U.S. patent application Ser. No. 09/912,214 entitled "Waveguide Laser with Mode Control and Pump Light Confinement", filed 24 Jul. 2001 now U.S. Pat. No. 6,785,304. The '214 application is assigned to the assignee of the present invention with a common inventor. The entire disclosure of Ser. No. 09/912,214 is hereby incorporated by reference in its entirety. This application also claims the benefit of U.S. Provisional patent application Ser. No. 60/338,125 entitled "Pumping Architecture for Waveguide Lasers", filed 13 Nov. 2001. This application is also related to U.S. Ser. No. 10/293,049, entitled "Laser Processing Method and System", filed the same day as the present application.

BACKGROUND OF THE INVENTION

1. Field of the Invention

The present invention generally relates to pumped solid-state lasers, amplifiers, and laser processing devices and methods for using same and, particularly, when such pumping is provided by one or more laser diodes. The invention also relates to amplification of pulsed laser beams such as those produced by q-switched and/or mode locked lasers. Several embodiments include planar waveguide devices and the use of the same for high and low power laser material processing and micro-machining applications.

2. Background Art

Most solid state laser applications benefit from the use of laser sources which have high beam quality, high efficiency, and high reliability, and which are low in cost. When compared to lamp-pumped, solid state lasers, LPL's, diode-pumped, solid state lasers, DPL's, offer significant advantages in terms of beam quality, efficiency, and reliability, but their cost effectiveness is hampered by the high cost of laser diodes.

An improved solid state laser architecture will provide for scalability to high power while maintaining high beam quality and stability over a wide range. Certain material processing applications, for instance micro-machining, have stringent requirements so as to machine miniature features with tight tolerance. Fiber lasers offer good power scalability but are limited at high power as a result of non-linear interactions in the gain medium, which is often several meters in length. It is generally difficult to achieve the requirements with rods, slabs, and thin disk lasers.

Various solid-state laser architectures are possible candidates for high power and low power diode pumped laser systems. One of these architectures is a planar waveguide laser architecture. Planar waveguide technology is scalable to high power while maintaining beam quality over a wide range of power levels. U.S. Pat. No. 6,160,824 entitled "Laser Pumped Compound Waveguide Lasers and Amplifiers" and co-pending U.S. application Ser. No. 09/912,214 entitled "Waveguide Laser with Mode Control and Pump Light Confinement", filed 24 Jul. 2001, describe various aspects of planar waveguide technology. The co-pending Ser. No. '214 application is assigned to the assignee of the present invention with a common inventor. Both the '824 patent and the disclosure of Ser. No. '214 are both incorporated by reference in their entirety. Data regarding diode pumped planar waveguide lasers and amplifiers has been published by ORC Southampton, and Maxios Laser Corporation among others: Shepherd et. al., "A Diode Pumped, High Gain Planar Waveguide Nd: $Y_3Al_5O_{12}$ Amplifier", University of Southhampton, ORC Research Center Review, 26 Mar. 2001, and R. J. Beach et. al., "CW and Passively Q-Switched Cladding Pumped Planar Waveguide Lasers" (Maxios Corporation).

High beam quality is a desirable feature of many laser processing systems, particularly for precision micromachining. Some methods for controlling beam quality in solid state lasers are disclosed in patent publications WO 0152367, WO 0027000, and U.S. Pat. Nos. 5,818,630 and 6,163,558.

In high power solid state lasers long term stability of output power and/or beam quality is affected by the temperature profile of the gain medium. Planar waveguides are typically face cooled by attaching a heatsink to the outer face of the substrate and/or cladding. Face cooling causes the heat to flow perpendicular to the plane of the core resulting in an essentially one-dimensional thermal gradient in the core. Thermal effects during laser operation are minimized because the lasing region is about 2 orders of magnitude thinner than that used in rod or slab lasers. Temperature differences between the center of the guide and the edge are on the order of 0.1° C., and can be neglected. The minimal temperature gradient in the guided direction, combined with the guiding effect of the waveguide structure eliminate any thermally induced optical effects like the thermal lensing seen in rod geometry lasers. The thermal gradient within the core in the transverse direction is dependent on the pumping and cooling arrangement. The transverse gradients, though relatively small, can be large enough to produce undesirable lens effects, particularly in a side pumped arrangement. Exemplary US patents related to compensation of thermal effects in high power solid state lasers include U.S. Pat. Nos. 4,617,669; 6,418,156; and 6,002,695.

High peak power pulses are often produced by solid state lasers using well known q-switching techniques. Two main classes of q-switches exist, active and passive. Active q-switching is often implemented with an acousto-optic or electro-optic modulator. The following exemplary patents relate to q-switching: U.S. Pat. Nos. 4,057,770; 4,742,523; 4,860,296; 5,408,480; 5,495,494; and 6,160,824.

A plane polarized laser output may be advantageous in certain laser material processing applications. Without some polarization loss control mechanism the output of a planar waveguide laser will be randomly polarized. Patent publication WO 0027000 relates to a technique for producing a polarized output from planar waveguides and other laser structures.

Fast rise time modulators with low delay can be used in a variety of laser based systems, including laser material processing, measurement, and telecommunication systems. In typical laser processing systems electro-optic (Pockels cells) or Acousto-optic modulators are used. The Pockels cells require Kilovolt level signals for on-off switching and acousto-optic modulators are often limited by acoustic transit time. Waveguide technology offers potential for high speed switching with simplified electronics.

In high gain lasers and amplifiers, for instance power amplifiers in Master Oscillator-Power Amplifier or q-switched configurations, the maximum possible gain is limited by Amplified Spontaneous Emission (ASE) and/or paristic oscillations. These effects deplete the stored energy and effectively clamp the gain. The following patents relate to techniques for suppressing ASE and/or parisitic oscillations in lasers: U.S. Pat. Nos. 3,946,128; 4,849,036; 4,918,703; 5,084,888; 5,317,585; 5,335,237; 5,569,399; 5,636,053; 5,852,622; 6,141,475; and 6,418,156.

Improved limits of performance of present material processing systems are expected with use of at least one embodiment of the present invention set forth in the following sections. For instance, various embodiments may be used in (a) high power diode pumped lasers for applications such as laser welding and soldering, (b) lower power diode pumped lasers for applications such as marking, cutting, drilling, machining, and communications (c) in emerging micro-machining applications, for instance in applications wherein metal or dielectric materials are micro-machined in a non-thermal manner with high energy, short (sub nano-second) or ultrashort (femtosecond-picosecond) pulses, (d) in high gain amplifiers for amplifying laser beams and (e) for beam manipulation and control.

SUMMARY OF THE INVENTION

An object of the invention to provide an improved method and system for laser based material processing systems.

One aspect of the invention is a waveguide based system for material processing including: a first waveguide gain section, and at least a second waveguide section coupled to the gain section for providing at least one function of output mode control, polarizing, modulation and q-switching. The second section is located along the direction of beam propagation.

Another aspect of the invention features a waveguide device for producing an output laser beam including: at least one waveguide section for providing at least one of function of output mode control, polarizing, q-switching, amplification, and modulation in a single waveguide section. The at least one section may be used as an auxilary element in a laser system wherein a gain medium other than a planar waveguide medium produces a laser beam which is coupled into the waveguide section.

The above object and aspects of the present invention are readily apparent from the following detailed description of the preferred embodiments for carrying out the invention when taken in connection with the accompanying drawings.

BRIEF DESCRIPTION OF THE DRAWINGS

FIG. 1 is an illustration of an exemplary waveguide laser;

FIG. 2 is a schematic representation of a portion of a pulsed laser material processing system (MOPA) utilizing a waveguide device in one embodiment of the present invention, with an expanded view of a monolithic device shown;

FIG. 3 is a schematic representation of a portion of a pulsed laser material processing system (q-switched) utilizing a monolithic waveguide laser and q-switch in an embodiment of the present invention, with an expanded view of the monolithic device shown;

FIGS. 5A–5E generally relate to cooling of the gain medium of waveguide and certain other solid state lasers, and illustrate compensation for thermal lens effects with heat sink designs providing non-uniform cooling;

FIGS. 6A–6B generally relates to the use of a zig-zag beam path in a planar waveguide laser to cancel thermal effects which may supplement or be used as an alternative to non-uniform cooling;

FIGS. 7A–7E illustrate several embodiments which may be used to produce a polarized output beam from monolithic waveguide structures;

FIG. 8 illustrates the use of saturable absorber material and a high speed laser diode to produce a high speed, semi-active q-switch for use with a waveguide laser;

FIGS. 9A–9D illustrate various embodiments of waveguide modulators for polarizing, q-switching, optical switching, and output mode control;

FIGS. 10A–10F generally relate to a waveguide structure suitable for high gain optical amplification wherein ASE and parasitic oscillations are suppressed with the use of side claddings, while facilitating multi-pass pumping arrangements;

FIGS. 11A–11G generally relate to a scalable face pumping architecture for waveguide lasers having improved efficiency.

DETAILED DESCRIPTION OF THE PREFERRED EMBODIMENTS

Figure 4A:
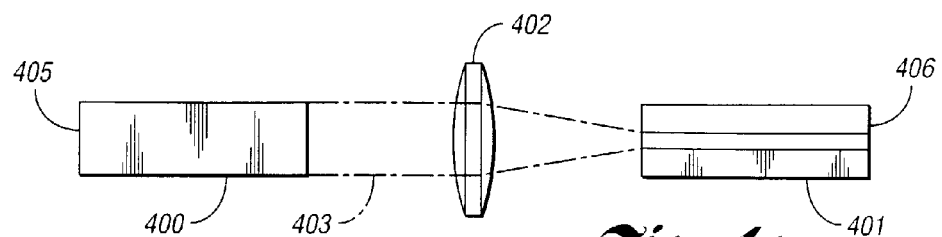
FIGS. 4A–4H illustrate top and side views of several embodiments wherein a resonator is used to control the beam quality by swapping the guided and unguided beam axes between passes through the gain medium.
Figure 4B:
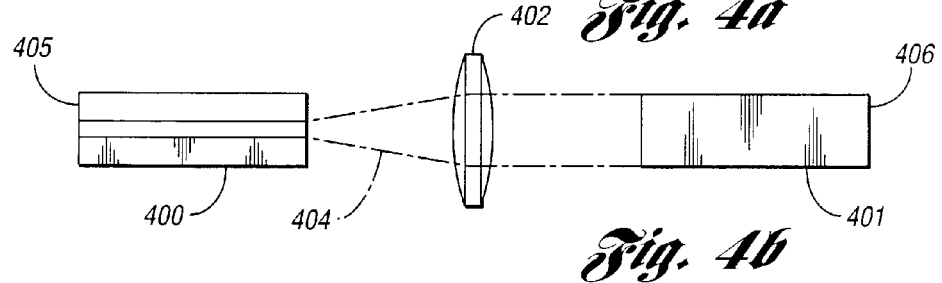

A fundamental figure of merit for a laser material processing system, for instance a micro-machining system for removing material while avoiding collateral damage, may be based on a combination of one of more of beam quality, pulse width, repetition rate, and peak pulse power. A compact, perhaps monolithic, solid state laser and/or amplifier system introduces a potential option for power scaling while providing good beam quality and narrow pulse width. Q-switched or MOPA (Master Oscillator-Power Amplifier) configurations may be used for various applications.

In at least one embodiment of a laser processing system of the present invention a pumped laser waveguide medium is used to produce an approximately diffraction limited output beam, for example a beam with an M*squared value of about 1.2 or less. The length of the of the pumped region may be about 1 centimeter (cm) for approximately average power of 10 Watts. The pumped region may be scaled to several cm (e.g. 5 cm) for scaling of output power to higher levels, say to 10 s or even 100 s of Watts. Additionally, because cavity lengths on the order of a few cm characterize the laser resonators of waveguide lasers, nanosecond and sub-nanosecond q-switched output pulses can readily be generated. It is to be recognized that the small cross sectional area of waveguides can be used to produce very high gain compared to laser rods or slabs. Raman shifting, which is a function of the length of the gain medium, is negligible compared to fiber lasers. Hence, planar waveguide lasers and/or amplifiers, when used alone, can be expected to provide an improved figure of merit. However, it is to be understood that various planar waveguide embodiments of the present invention, including amplifiers, modulators, semi-active q-switch and the like may be used in combination with fiber or rod technologies to create a solid state laser system in accordance with pre-determined specifications.

Co-pending U.S. patent application Ser. No. 09/912,214 entitled "Waveguide Laser with Mode Control and Pump Light Confinement", assigned to the assignee of the present invention with a common inventor is hereby incorporated by reference in its entirety. (The application will hereafter be referred to as Ser. No. '214.) The application discloses various planar waveguide amplifier and laser structures (pp. 16–26, and FIGS. 6–12), with a preferred arrangement shown in FIGS. 6A–6D of Ser. No. '214 with corresponding details on pp 16–26. Pump light confinement and output mode control are provided is separate sections along the direction of beam propagation. FIGS. 12a–12d of the present application also shows the arrangement.

U.S. Pat. No. 6,160,824 entitled "Laser Pumped Compound Waveguide Lasers and Amplifiers" (hereafter referred to as '824) is hereby incorporated by reference in its entirety. The '824 patent discloses a compound planar waveguide structure comprising multiple confinement structures. The planar waveguide may include a central laserable core layer substantially sandwiched by at least two non-laserable cladding layers to provide an interface between the inner surfaces of the cladding layers and the gain medium to define a first waveguide and the outer surfaces of the cladding layer define a second waveguide for containing pump radiation within the waveguide.

FIG. 1 illustrates a basic waveguide structure which may be used as a component in an embodiment of a laser processing system. It is to be recognized that various improvements herein may be used to provide such a planar waveguide laser or amplifier with improved performance. For instance, the device may be non-uniformly cooled on both faces to improve the stability or to produce a desired output mode.

Exemplary specifications for a near Infrared laser output source for pulsed laser material processing, for instance laser marking, trimming, texturing or drilling may include:

TABLE 1

| Wavelength | 1.064 microns (um) |
|---|---|
| Repetition Rate | 10–50 Kilohertz (Khz) typical |
| Pulse Width | 1 nanosecond (ns) typical |
| | <30 ns |
| | <15 ns preferred |
| Pulse Energy | 800–4000 microjoules (µj) typical |
| | >300 µj preferred |
| | >100 µj |
| Average Power | 40 W typical |
| Pulse-Pulse Stability | 1% (standard deviation) |
| Beam Quality | M-squared (M2) < 1.3, |
| | Ellipticity (e) > .9 |
| | M2 < 1.2 preferred |
| Pointing Stability | <50 microradians (urad) typical |
| Operating Temperature (Ambient or System Enclosure) | 15–30 deg. C. |
| Maintenance Interval (MTBF) | 10,000 Hrs |

Short wavelengths, for instance green or ultraviolet wavelengths, may facilitate material removal without undesirable thermal effects in certain material processing applications, particularly with use of narrow pulsewidths. Cost effective UV systems implemented in a solid state architecture may have increasing application in laser ablation and etching of materials. The ablation threshold of target materials, for instance transparent dielectrics or polymers, may be exceeded and thermal effects minimized (e.g. non-thermal ablation). For example, as taught in "Excimer-Laser Ablation and Etching", CIRCUITS AND DEVICES, 1990, IEEE, Kapton samples may have an ablation threshold of about 0.5 Joules/cm$^2$, and may be micromachined with relatively short 20 ns Ultraviolet (UV) pulses, having a wavelength of 248 nm, so as to remove about 1500 Angstroms with each pulse. However, various other dielectric materials, for instance Silicon Dioxide, require much higher fluence. Fluence is increased at decreasing spot size, and a limit of about 0.3 µm may be achieved at the UV wavelength. However, it may be desirable to use a larger spot, for example 10–100 µm, for some coarse, high speed operations. Higher available peak pulse energy is desirable for ablation to provide for improved overall figure of merit for solid state based UV systems. With added components for harmonic generation the IR laser source with the above specifications may be used to produce relatively high energy, short UV pulses. For instance, after wavelength shifting.

TABLE 2

| Wavelength | <400 nm |
|---|---|
| Pulse Energy | 300–650 µj typical |
| Average Power (UV) | 3–4 W typical, about 10 W preferred |
| Beam Quality | M$^2$ < 1.3, ellipticity > .9 typical |
| | M$^2$ ≤ 1.2 preferred |
| Pulse Width | 1 nanosecond (ns) typical |
| | <30 ns |
| | <15 ns preferred |
| Repetition Rate | 6–10 Khz typical |
| | 10–25 Khz preferred |
| | >20 Khz most preferred |
| Pulse-Pulse Stability | 2–3% (1 standard deviation) |
| Pointing Stability | <50 microradians, over 8 hrs |
| Operating Temperature | 15–30 deg. C. |
| Crystal Damage | <.5% power loss per Millijoule exposure |

It is contemplated that the above exemplary parameters will be useful in numerous micro-machining applications including via formation in electronic circuits, laser trimming, cutting, texturing, and numerous micro-machining applications. Waveguide technology offers potential to produce short, high peak power pulses while meeting at least the above beam quality requirements. Further, potential for a compact, scalable laser processing architecture exists. Other micromachining applications, for instance laser repair of redundant memory circuits, may be performed with short pulses having lower pulse energy (e.g., about 20 µj or greater).

In certain embodiments of the present invention, a waveguide amplifier may be used to produce high output pulse energies as a result of suppressing spurious outputs including ASE and parasitic oscillations. In one embodiment, a waveguide amplifier having a non-cylindrical guiding region with a high aspect ratio (e.g., greater than 10:1 with the guiding direction in the narrow dimension) may be used to amplify ultrashort input pulses having a pulsewidth of about 10 femtoseconds to 50 picoseconds, for non-thermal ablation of target material.

It is to be recognized that a solid state laser system with a scalable architecture may also used for various other high power applications, for instance laser welding, engraving, or soldering. For instance, a waveguide laser with a gain medium length of several cm. may produce outputs approaching or exceeding 100 W. It is to be recognized that increasing power levels can be obtained with a tradeoff in beam quality and such a tradeoff may be acceptable for certain applications.

In one embodiment output power of 46 Watts was achieved from an all YAG waveguide, produced for the assignee by ONYX optics, with 120 W input pump power with about 100 W absorbed. The specified core width was 50 µm. Output beam quality with M-squared of about 1.3 was achieved along the guided direction. The device included separate waveguide sections for pump light confinement and mode control (see FIG. 12), as generally taught in Ser. No. '214. In the experimental arrangement two sets of 60 W pump diodes (e.g., a first set 1279 shown in FIG. 12-d and a second set of the opposite side of the waveguide) were used with a cylindrical lens focusing to deliver pump energy to the waveguide core. A single waveguide face was cooled. It is expected that enhanced overall performance can be achieved with the use of various improvements detailed herein. For example, a negative thermal lens of 1.6 meter minimum focal length was observed during experiments, and the lens focal length varied with the diode pump current (focal length of the negative lens was about −33 m with no pump power applied). It is contemplated that cooling both faces of the structure could reduce thermal lens effects, and/or non-uniform cooling of the gain medium may reduce any corresponding time- or power-dependent focal length variations to within the tolerances required for precision micromachining. With double side cooling the device may preferably be constructed with claddings 208 having symmetric thickness, as depicted in FIGS. 2 and 3 and several other embodiments herein. A small spot and narrow depth of focus mandate a stable beam profile at the location of target material. It is beneficial to avoid a requirement for focal length adjustments within the laser processing system. A reduction in output variations as a function of time and pumping power (e.g., thermal lens focal length variation with time and/or temperature) may be obtained with non-uniform cooling of the gain medium. Other alternatives, for instance end pumping, may provide for operation at 100 W or greater, for instance in material processing systems for welding, cutting or soldering.

In one embodiment of a basic MOPA system for material processing planar waveguide technology may be used for pulse amplification of seed laser outputs. FIG. 2 illustrates an embodiment wherein a microchip laser 200, for instance an Nd:YAG device manufactured by JDS Uniphase, is used as a seed laser. The seed laser may be an active q-switched device. Alternatively, the seed laser may be a semiconductor diode laser, mode locked laser etc. In FIG. 2 (with bulk optics used to deliver the seed laser pulse), a cylinder lens 201 delivers the output of the seed laser into the pumped core 209 of the gain section 204 located between pump claddings 208. It is to be understood that various alternatives for coupling the laser energy to the waveguide may be used; generally the NA (numerical aperture) of the input beam will preferably be matched (or will not exceed) the NA of the waveguide modes. For instance, a few methods of coupling of laser energy into waveguides is discussed in FUNDAMENTALS OF PHOTONICS, Saleh & Teich, Wiley & Sons, 1991, pp. 261–264.

The pumped waveguide structure 203 preferably also provides pump light confinement in gain section 204 and mode control in section 206, for instance corresponding to FIG. 6A-6D of the referenced Ser. No. '214 disclosure. The figures correspond to 12a–12d of the present application. An exemplary optional section 205 for producing a polarized output beam is shown as an additional function. In at least one embodiment of the present invention multiple functions, which may include polarizing, are provided in a plurality of sections (e.g., depicted by dotted lines 212 in FIG. 2 to show separate functions) along the direction of beam propagation as shown. The laser output at the output surface of pumped core 209 is polarized in the core of section 205, and the polarized output beam is coupled into mode control section 206. The polarized, mode controlled output beam exits from the device at the core output surface of section 206. Additional beam shaping optics 202 are typically used at the output to convert the elongated beam emerging from the waveguide into a circular beam which is focused onto target material, for instance.

In a preferred embodiment of the present invention the generation of pulses will be externally controlled with a control signal 220 provided by a computer 232 or other processor within the material processing system. A separate control signal may also be applied to the pump diodes so as to energize the diodes or regulate pumping power. Similarly, the signal may provide for pulsed pumping of the diodes as taught in U.S. Pat. Nos. 5,291,505; 5,812,569; and 5,854,805. The control signal 220 is synchronized with position information relating target material 210 coordinates to laser beam position coordinates. Beam positioning and associated information may be obtained from sub-systems having various combinations of laser beam deflectors 230, X-Y positioners 231, rotation positioners and the like. Most preferably, the laser processing system will provide for generation of pulses having output energy which is substantially constant over a range of repetition rates. The following U.S. patents and patent publications illustrate various micromachining applications including marking, drilling, trimming, and circuit repair, and options for pulse control and synchronization in laser processing systems: patent publications WO 0064622; WO 0154854; WO 0176806; U.S. application 2002/0162973; and U.S. Pat. Nos. 6,339,604; 6,114,118; and 5,998,759.

In another embodiment for pulsed laser material processing a passive q-switched device may be used to generate output pulses. The '824 patent, for instance, describes a passive waveguide structure having a passive q-switch.

Figure 9A:
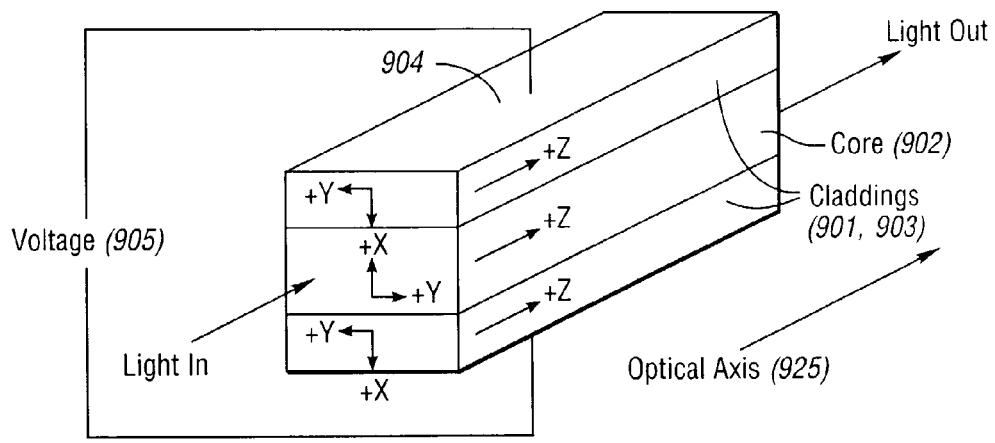
Figure 9B:
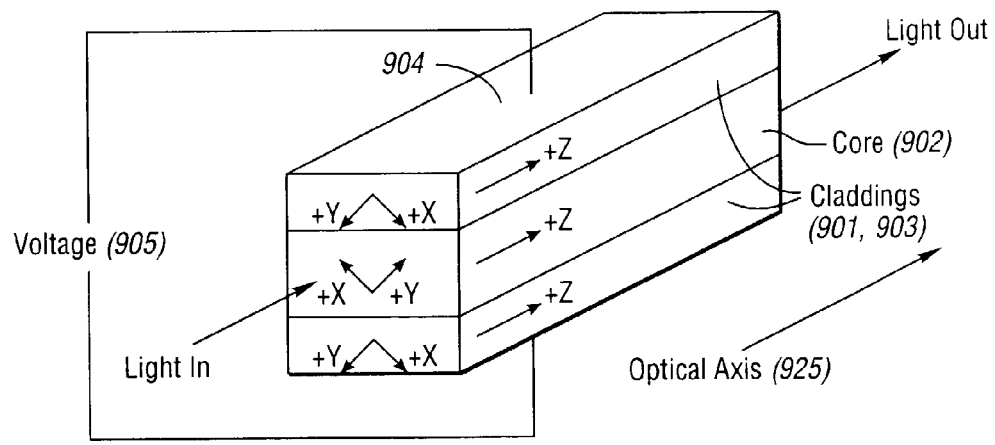
Figure 9C:
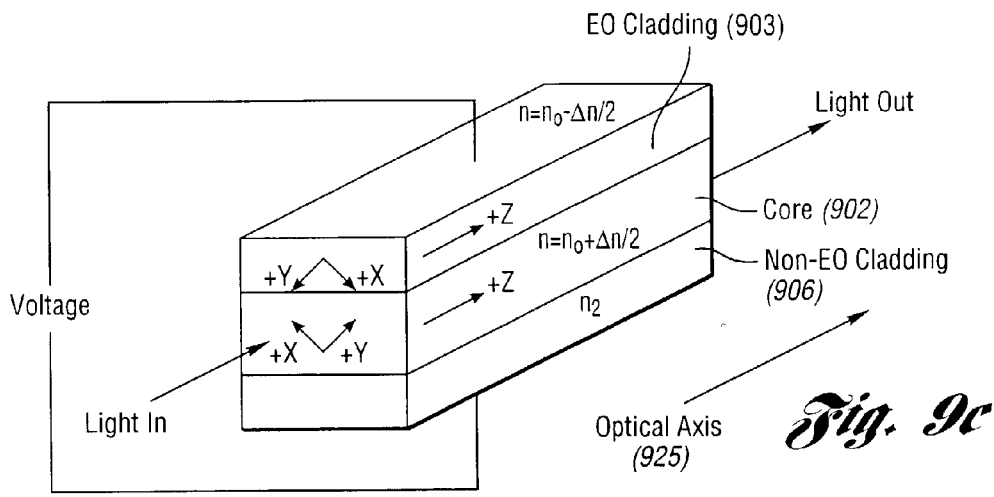
Figure 9B:
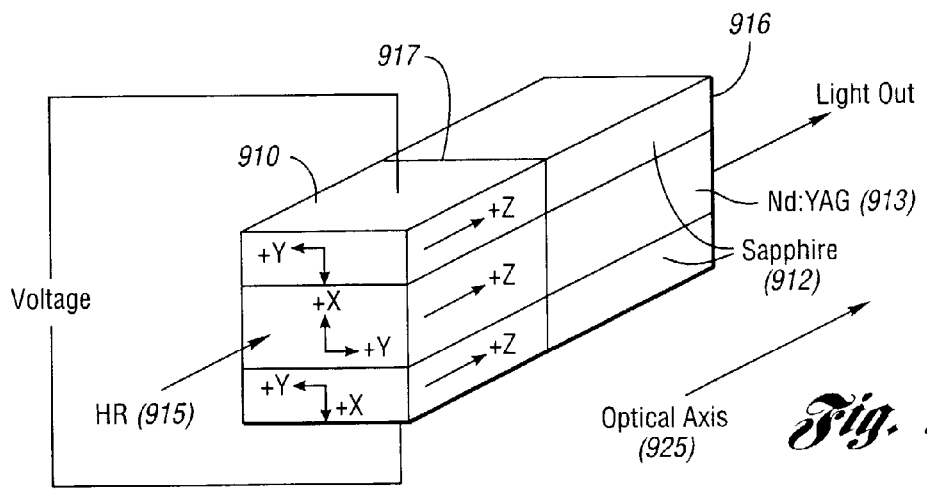
Figure 10A:
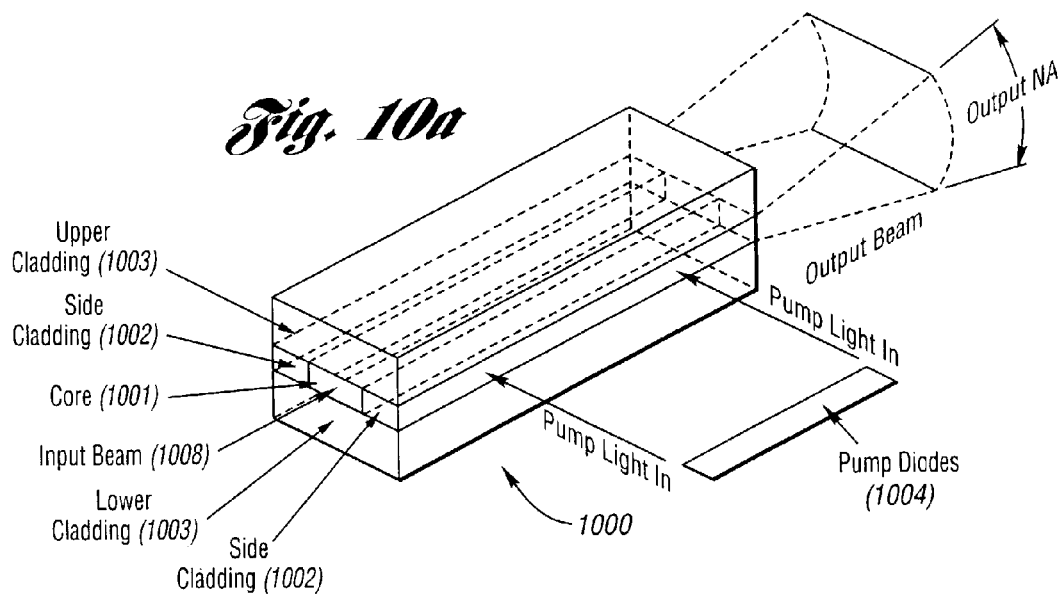
Figure 11C:
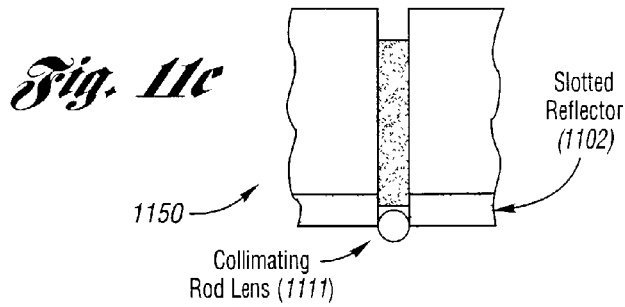
Figure 11D:
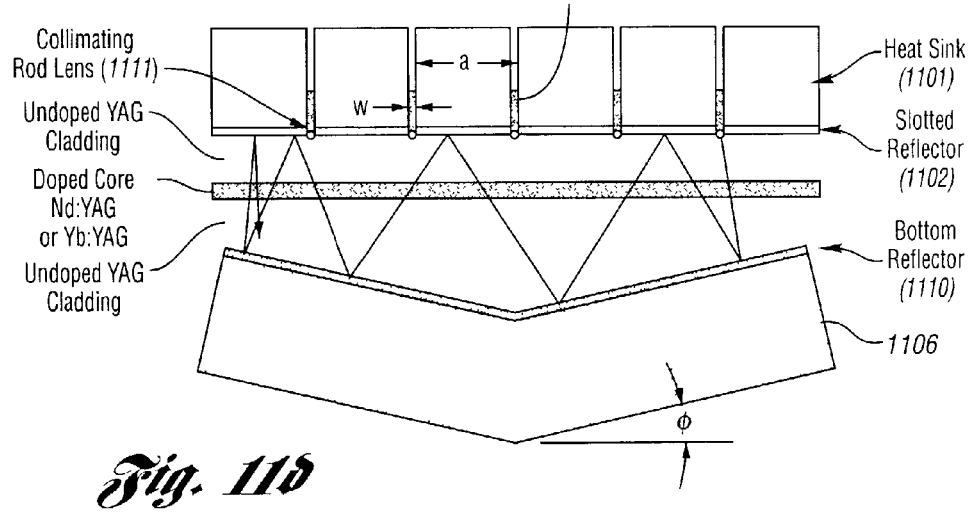
Figure 11E:
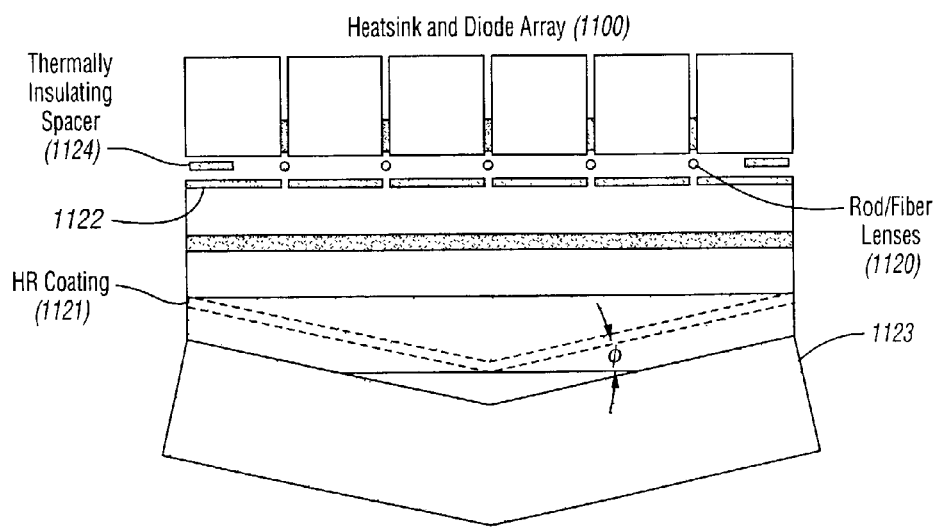
Figure 11F:
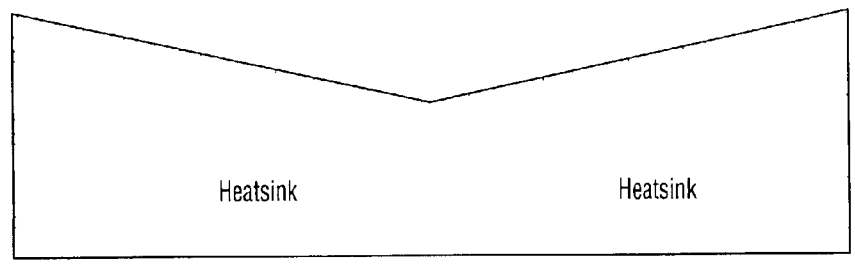
Figure 11G:
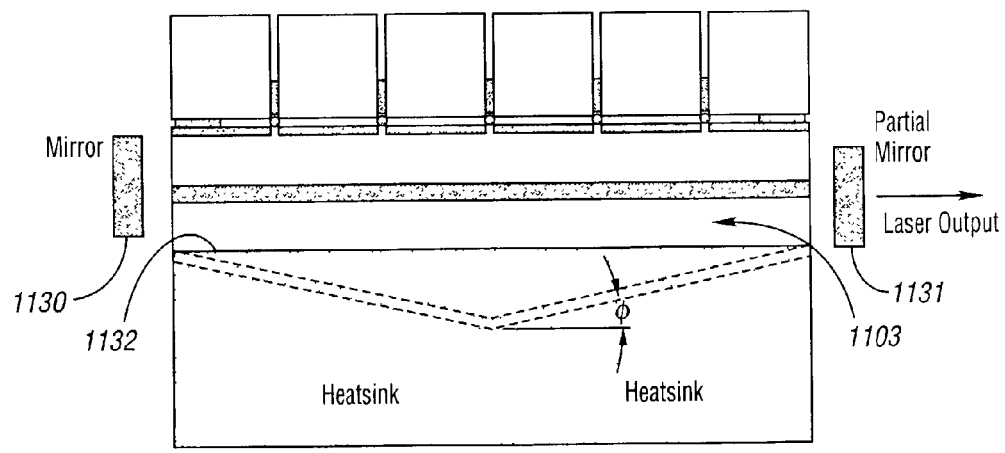

Refer to FIG. 3. In at least one alternative embodiment of a laser material processing system pulses may be generated with a "semi-active" q-switched laser 300 allowing for preferred external control 220 and synchronization as generally shown in FIG. 8. In one embodiment the semi-active q-switched laser will be fabricated as a monolithic device with saturable absorber material 305 which is excited by external energy source, for example a laser diode. A pumped core 209 of the gain section is bounded by a strip of section of saturable absorber material 305 which controls the loss of the gain medium. Details of such a monolithic device, preferred for a low delay q-switched system producing nanosecond or sub-nanosecond pulses, are disclosed in the following sections. Further, in yet another embodiment to be detailed in a following section, a polarized waveguide laser with an electro-optic waveguide Q-switch is proposed as generally shown in FIG. 9D.

It is to be recognized that mode control section 206 of FIG. 2 is not essential. For example, optical system 202 may include components for spatial filtering in at least one direction, or other optics for wavefront correction. Further, in certain embodiments integrated lenses, gratings, or other components may be used. For example, Ser. No. '214 discloses an embodiment wherein a grating is placed in contact with the core for output mode control.

An optional external waveguide modulator 207 may be used to control the temporal shape of pulses, for pulse selection, polarizing, or for output mode control. The modulator may be used in a MOPA or q-switched system. Alternatively, or in conjunction with 207, a modulator 227 in FIG. 2 may be used to produce a predetermined temporal pulse shape prior to amplifying a pulse, to controllably select pulses for amplification, or to generate pulses from a CW source. For instance, the modulator may be used to select a central portion of a q-switched seed pulse having a longer pulse width than desirable, wherein the modulator provides for a fast rise and fall time. A modulator having at least a 100:1 extinction ratio, a delay time of a few nanoseconds or less, and a rise/fall time of about one nanosecond or less is preferred. Typically electro-optic (Pockels cells) or acousto-optic modulators are used in material processing systems. A waveguide device provides an alternative for such high speed switching. A monolithic device may also be realized, for instance by fabricating the waveguide with section 205 or 206 functioning as a modulator. With waveguides the transit time limitation associated with acousto-optic devices is avoided. Further, some limitations associated with Pockels cells and Mach-Zehnder interferometers can be avoided. Several alternative waveguide modulator embodiments, generally shown in FIG. 9, are detailed in a following section which can be used for such as switching application. Alternatively, the waveguide modulator may be used to implement functions including q-switching, or to control at least one of output NA (numerical aperture), or temporal shape, or to produce a polarized output. For instance, the modulator can be used in a device wherein functions of pump light confinement and mode control are provided in separate sections of the device as taught in Ser. No. '214. Preferably, these functions are implemented in a monolithic device structure. However, it is to be understood that separate waveguide sections may be used having different indices of refraction, cladding materials etc., and that the waveguides may be coupled with an imaging system etc. as also taught in Ser. No. '214.

In many demanding material processing applications beam quality, stability, and reliability are fundamentally important specifications in addition to specified pulse parameters (e.g., peak power, pulsewidth). Performance of waveguide based systems can be improved with various embodiments and alternatives as taught herein, which may include options for mode control (affecting beam quality in both the guided and unguided (transverse) directions, (generally shown in FIG. 4), alternative pumping architectures (for instance face pumping with a scalable optical system generally shown in FIG. 11), cooling, (for instance generation of non-uniform cooling profiles to control a temporal, spatial, or polarization output mode, generally shown in FIG. 5), beam path control (for instance a zig-zag transverse beam path, generally shown in FIG. 6), an optional device with a linearly polarized output (generally shown in FIG. 7). Further, in at least one embodiment wherein a waveguide device is to be used as a high gain amplifier (e.g., MOPA configuration) parasitic oscillations may be suppressed by modifying the device structure with additional side claddings (generally shown in FIG. 11). These improvements, detailed in the following sections, may be applied to various embodiments of copending application Ser. No. '214, including the preferred embodiment. However, it is to be understood that the improvements and teachings herein may be applied to other waveguide structures and/or combination of structures, including those of the '824 patent. Similarly, certain implementations may be used to improve the performance of other diode pumped solid state laser systems, for instance disk, slab, or rod lasers.

Ser. No. '214 Preferred Embodiment

FIGS. 12a–12d show details of the preferred embodiment of Ser. No. '214, and correspond to FIGS. 6a–6d of the Ser. No. '214 disclosure.

The laser 1260 includes a waveguide core 1262 of 1.0% doped Nd:YAG which may be 5–200 microns thick, 0.5–10 mm wide, and 10–150 mm long. For one specific case, the actual core dimensions are 30 microns thick×5.5 mm wide× 30 mm long. The laser 1260 also includes a sapphire cladding/structural member 1264 that is 0.5–10 mm thick with a length and width equal to that of the core 1262 and is optically contacted and diffusion bonded to the core 1262 via their large faces 1261 and 1263, respectively. For the specific case mentioned above, the actual thickness of the structural member 1264 is 3 mm.

The laser 1260 further includes a sapphire pump guide cladding component 1266 which is 0.1–1 mm thick, with a width equivalent to that of the core 1262, and a length 50% to 90% as long as that of the core 1262 optically contacted and diffusion bonded to an exposed large face 1265 of the core 1262 via one of its large faces 1267 so that its end 1268 is flush with one end 1269 of the waveguide core 1262. For the specific case mentioned above, the actual thickness and length of the sapphire pump guide cladding component 1266 are 0.5 mm and 24 mm, respectively.

The laser 1260 still further includes a 0.8% doped Nd:YAG mode control cladding component 1270 which has a thickness equivalent to that of the pump guide cladding component 1266, a width equivalent to that of the core 1262, and a length equal to the length of the core 1262 minus the length of the pump guide cladding 1266, is optically contacted and diffusion bonded to the remaining portion of the exposed face 1265 of the core 1262 via one of its large faces 1271 so that its end 1272 is flush with the opposite end 1273 of the waveguide core 1262.

End faces 1274, 1275 and 1276 of the waveguide structure, those faces perpendicular to its length, are polished to form a hybrid stable/unstable resonator. The resonator is stable in the guided direction but unstable in the transverse direction. The unstable resonator is a confocal design (the sum of the end face radii is equal to twice the length of the resonator).

Figure 12A:
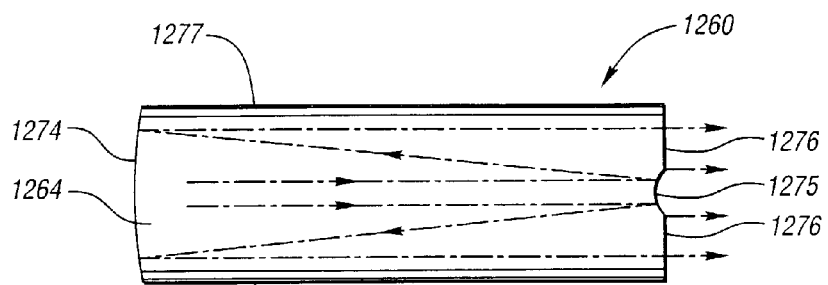
FIGS. 12A–12D relate to a specific embodiment of a planar waveguide laser having separate sections for pump light confinement and mode control.
Figure 12B:
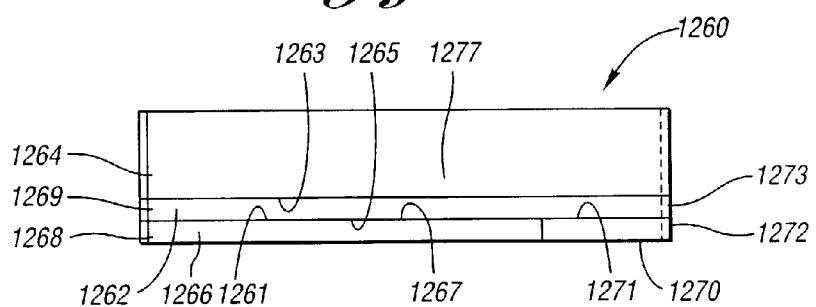
Figure 12C:
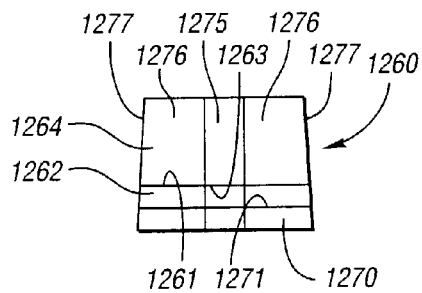
Figure 12D:
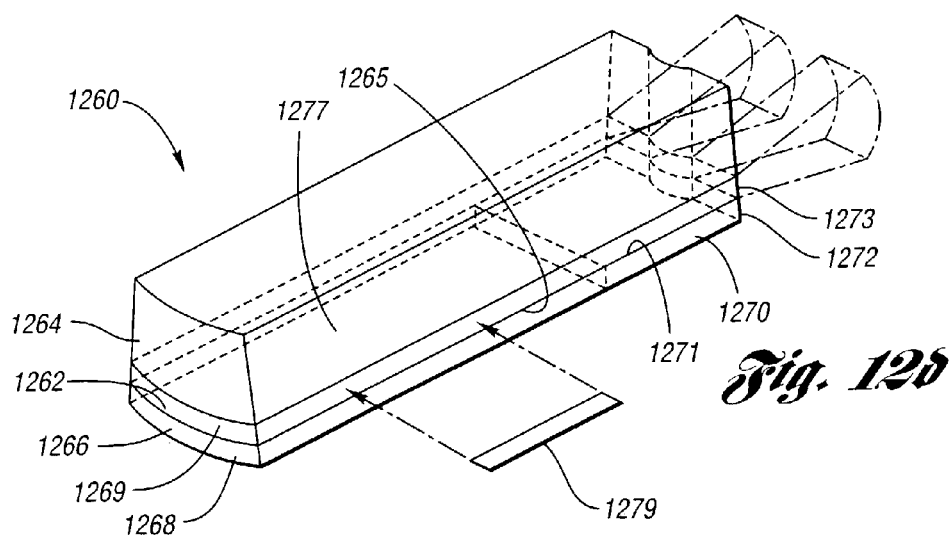

The laser 1260 further includes coatings (not shown) at the laser wavelength which are applied to the end faces 1274 and 1275 as shown in FIG. 12a to form the resonator mirrors. In particular, HR coatings at the laser wavelength are applied to the convex cylindrical surface at the end face 1274 and to the concave cylindrical surface at the end face 1275.

The outer top/bottom surfaces of the structural member 1264, the pump guide cladding 1266, and the mode control cladding 1270 are fine ground to scatter any light which hits them.

A heatsink (not shown) is bonded to the ground surface of the pump guide cladding 1266 to provide cooling.

Side faces 1277 of the composite waveguide are polished and AR coated at the pump light wavelength and at the laser wavelength. The side faces 1277 are canted to form a trapezoid in a cross-section perpendicular to the optical axis in order to suppress parasitic oscillations. In the specific case mentioned above, these side faces 1277 are each canted by 3 degrees.

The end faces 1276 of the composite waveguide are polished and AR coated at the laser wavelength. The end faces 1276 may be canted relative to the plane of the core so that reflections off of these faces will not stimulate the backward traveling unstable mode.

Pump diodes 1279 are butt-coupled to the sides of the waveguide core 1262 along the length of the pump guide cladding 1266 but not along the length of the mode control cladding 1270.

The embodiment of the invention described above and shown in FIGS. 12a–12d uses bulk sapphire and YAG that are optically contacted to the doped YAG core 1262 of the waveguide device to serve as pump light confinement and mode control claddings 1266 and 1270, respectively. The adhesion of these claddings 1266 and 1270 to the core 1262 can be enhanced by diffusion bonding them to the core 1262 and possibly also diffusion bonding them to each other.

This structure has advantages over the prior art, for instance the 5-layer structures in the '824 patent, in that it provides good pump light confinement and good mode control yet the waveguide is only a three-layer structure and the cladding layers 1266 and 1270 can be much thicker than in a double-clad structure. Both of these aspects make fabrication much simpler. The only limitation on the thickness of the pump cladding 1266 is that the waste heat deposited in the core 1262 by the pump light must be removed by conduction through the pump cladding layer 1266. For convenience, the mode control cladding 1270 would probably be fabricated with the same thickness as the pump cladding 1266.

In the pumping section, the sapphire claddings with a refractive index of about 1.75 surround the Nd:YAG core 1262 with a refractive index of about 1.82 to define a symmetric waveguide with a NA of about 0.5. This high NA in the pumping section provides excellent capture of the highly divergent fast-axis emission from the pump diodes 1279 that are butt-coupled to the sides of the pumping section. The width of the structure is sufficient to guarantee that nearly all of the pump light entering the sides of the pumping section is absorbed in a single pass. The sides of the structure are anti-reflection (AR) coated at the pump wavelength and at the laser wavelength. The elimination of any optical elements between the pump diodes 1279 and the active medium and the nearly complete absorption of the pump light in a single pass make the pumping efficiency of the design very high.

In the mode control section, the waveguide device 1260 is asymmetric. The very small refractive index difference ($\Delta n \approx 0.0001$) between the 0.8% doped mode control cladding 1270 and the 1.0% doped core 1262 defines a very low NA asymmetric waveguide with a NA of about 0.01. This mode control section has an effect similar to placing a mode control aperture into the resonator of a conventional rod-type laser, it blocks the buildup of high order modes. Even though the high NA of the pump section is capable of propagating high order guided modes with low loss, only the lowest order mode can propagate through the mode control section with low loss. The high loss seen by the higher order modes prevents them from building up so only the lowest order mode lases.

An advantage of the present invention over double-clad designs is that the mode control cladding 1270 can be doped with the same ion as the core 1262. Since for most solid state gain media there is a very small change in refractive index with doping level, by doping the mode control cladding 1270 just slightly differently than the core 1262 allows the creation of a very small index difference and thus a very low NA. The very low NA permits the use of a relatively thick core while maintaining single mode operation. The thicker core 1262 simplifies fabrication and loosens the alignment tolerances for butt-coupling of the pump diodes 1279. Since the dopant in the mode control cladding 1270 is the same as that in the core 1262, it is possible to control their relative doping level to high accuracy using standard production techniques.

One way to accurately control the relative doping level of the core 1262 and the mode control cladding 1270 is to take them from different sections of the same boule. There is a small change in the doping level from one end of a boule to the other end resulting from the YAG growth process. If the inner claddings in a double-clad structure were doped with the same ion as the core, a sizable portion of the pump light would be absorbed in the inner claddings and not in the core. This would result in low efficiency for single mode operation. Alternatively, if the inner claddings in a double-clad structure were doped with some other ion in order to decrease the index difference between the inner claddings and the core, it would be very difficult in practice to control the relative refractive indices adequately. Additionally if the doping level in the core of a double clad structure were reduced in order to reduce the index difference between the core and the inner cladding, the rate of pump light absorption in the core would be reduced and a much wider structure would be required in order to achieve the same efficiency. The increased width would make control of the transverse beam quality much more difficult.

In addition to controlling the NA of the laser's output mode, the mode control cladding 1270 helps to reduce the buildup of amplified spontaneous emission (ASE) and parasitic lasing modes. Parasitic modes that make reflections on the side faces of the waveguide structure would reduce efficiency and limit gain by extracting some of the absorbed pump power into modes that would not contribute to useful laser output. The sides 1277 of the waveguide structure are canted anti-parallel to eliminate parasitic guided lasing modes that might exist if the sides were perpendicular to the core 1262. The tilt of the side faces 1277 is enough create high losses for such modes by steering light which reflects off of the side faces 1277 to angles in the guided direction that are beyond the acceptance angle of the mode control section. The minimum tilt angle of the sides 1277 for this purpose is $\Theta_{min}=\sin^{-1}$ (NA of mode control section). This minimum angle is about 1.2° for a mode control NA of 0.02.

The mode control cladding 1270 thus helps to greatly reduce the tilt angle required on the sides 1277 compared to what would be required in a double-clad structure. To achieve the same parasitic suppression in a double-clad structure, its sides would have to be tilted far enough to steer the beam beyond the acceptance angle of the high NA outer clad to inner clad interface, about 30° for a 0.5NA outer waveguide. Since the large tilt angle required to block parasitic modes in a double-clad structure would present a number of problems, the present invention with its good parasitic suppression is better suited to q-switched operation where high gains are generated while pump energy is stored in the gain medium.

For all modes in waveguides, some portion of the beam energy in each mode propagates in the cladding and not in the core 1262. The discontinuous cladding of the present structure may cause some portion of this cladding energy to be clipped or scattered. However, for the relatively thick cores typically used, the percentage of energy in the wings of the lowest order mode is very small and there is a negligible impact on performance due to the discontinuous cladding.

An additional benefit of the embodiment shown in FIGS. 12a–12d is that the outer surface of the claddings can be diffuse ground to help scatter light that is at high enough angles to pass through the core/mode control cladding interface. This scattering creates a much higher loss for high divergence modes than that which is produced by a double clad structure. In a double clad structure, laser emission modes with divergence angles above the NA of the core/inner clad structure can still be guided with low loss by the high NA of the inner clad/outer clad interface. This means that in the double clad structure there is little difference in propagation loss for low NA modes and high NA modes. Mode control in the double clad laser relies on gain differences between the two sets of modes. The ratio of the gain for the high NA modes relative to the low NA modes in the double clad structure is dependent on the ratio of the core thickness to the total thickness of the core and the inner cladding layers (the core-to-clad ratio).

The embodiment of FIGS. 12a–12d with its much thicker mode control cladding layers 1270 which have ground outer surfaces offers higher propagation losses for high NA modes due to the scattering effect of the ground outer surfaces of the mode control cladding 1270. It also offers a larger gain difference between low NA modes and high NA modes due to the much smaller core-to-clad ratio. The result of these two effects is that obtaining laser output in only low NA output modes should be much easier than in a double clad structure design.

The scattering effect provided by the ground surface condition on the top and bottom surfaces of the composite waveguide structure also serves to block potential parasitic lasing modes that make reflections on these surfaces. The ground surfaces also help to reduce ASE by scattering spontaneous emission that strikes these surfaces rather than reflecting such light back to the core 1262 with low loss as a polished surface might do. To further enhance these effects, the ground surfaces might additionally be coated with a material that is absorbing at the laser wavelength.

In another variation of the embodiment shown in FIGS. 12a–12d, undoped YAG is substituted for Sapphire in both the pump cladding 1266 and the structural member 1264. Replacing the sapphire components 1264 and 1266 with undoped YAG components reduces the NA of the pump section but still provides the pumping section with a higher NA (about 0.04) than that of the mode control section (about 0.01). This makes pumping more complex because the diode output must be collimated in order to reduce its divergence to a value that will be guided by the lower NA pumping section. However, due to the lower NA in the pumping section, this arrangement has reduced levels of ASE and is less likely to suffer from parasitic oscillations. This is advantageous if the device 1260 is to be q-switched with large pulse energies or is to be used as a high gain amplifier Mode Quality Control—Guided and Unguided Directions In certain laser machining operations, for instance precision micro-machining, it is desirable that the beam quality be invariant with direction, or at least have predictable, controlled spatial characteristics with direction.

Planar waveguides can be designed to produce single mode beam quality in the guided direction if the thickness of the core is below the cutoff thickness for propagation of the next higher order mode. This cutoff thickness is related to the NA of the waveguide. For typical NA's, the maximum core thickness for single mode operation can range from a few microns to a few tens of microns. For a larger core thickness, the beam quality will be multimode in the guided direction unless some additional mode control technique is used.

In planar waveguide lasers, the spatial mode quality in the guided direction is typically controlled by the properties of the waveguide structure while the spatial mode quality in the transverse direction is independently controlled by the particular resonator design chosen. Achieving single mode output in both axes has proven difficult with such designs.

In at least one embodiment of the present invention the transverse beam quality in a planar Waveguide Laser is controlled to produce high beam quality output from multimode planar waveguide laser structure. Preferably, the spatial mode quality of a planar waveguide laser is controlled in both the guided and unguided directions. The beam quality is improved in the guided and unguided directions, while providing for single transverse mode operation or any desired multimode beam quality. As such, high beam quality output is produced from multimode waveguide structures.

Multimode waveguide structures are much easier to pump than single-mode waveguide structures. This approach can be used in both low power and high power lasers. For example, such an approach is contemplated in one embodiment for producing a 10 W UV laser having the parameters in Table 2, wherein the Infrared output is generated from a planar waveguide gain medium (e.g. from Table 1).

In at least one embodiment mode quality is controlled by swapping the guided and unguided axes between passes through a waveguide structure. This equalizes the beam quality in both directions to a good approximation. Several alternatives are contemplated, and in the embodiment below will be demonstrated below using a generic 3-layer planar waveguide corresponding to FIG. 1. However, any type of planar waveguide structure could be used. However, it is to be understood that various modifications and alternatives of the configurations taught below are within the scope of the present invention. It is to be understood that, when using any of the four alternatives below, the beam quality is controlled by the resonator and not the guiding properties of the core. Hence, a desired beam quality level can be maintained while utilizing multimode core structures that offer excellent pump-light confinement for high efficiency.

Dual Waveguide Approach:

Referring to the top and side views shown in FIGS. 4-A and 4B respectively, two separate waveguides 400, 401 are used in a linear standing wave cavity with their guided axes rotated by 90° relative to each other. A spherical lens 402 is used to focus the output from one waveguide into the other. As the beam is emitted from one waveguide, the lens collimates the beam in the guided direction to produce a beam diameter 403 approximately equal to the waveguide width, and focuses 404 the beam in the orthogonal unguided dimension. The second waveguide with its axes rotated by 90° is positioned at the focused beam waist. The outer end 405 of one waveguide is highly reflecting (HR) and the outer end 406 of the other waveguide is partially reflecting to serve as the output coupler (OC).

Figure 4C:
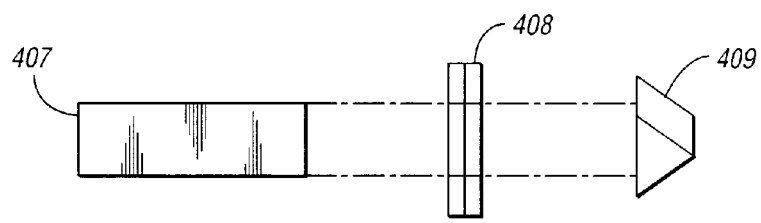
Figure 4D:
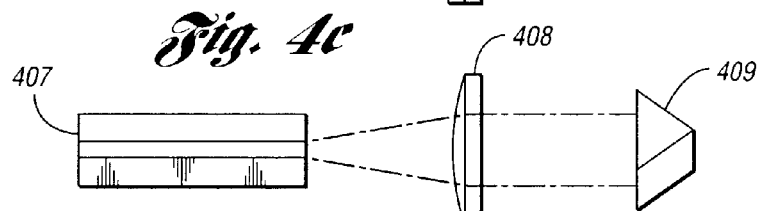

Porro Prism Approach:

Referring to the top and side views shown in FIGS. 4C and 4-D respectively, a single waveguide is used in a linear standing wave cavity. One end 407 of the waveguide is partially reflecting and acts as the output coupler. A cylindrical lens 408 is used to collimate the beam emitted from the other end of the waveguide to produce a beam with a round or square cross section. A Porro prism 409 is positioned after the cylindrical lens so that it retro-reflects the beam back into the cylindrical lens. The vertex of the Porro prism is oriented at 45° relative to the guide axis of the waveguide and positioned to pass through the optical axis. This has the net effect that the beam emerging from the Porro prism is physically rotated by 90° relative to the beam entering the Porro prism. The cylindrical collimating lens then focuses the beam back into the waveguide.

Figure 4E:
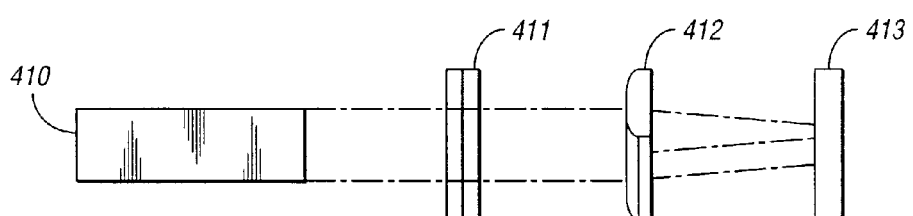
Figure 4F:
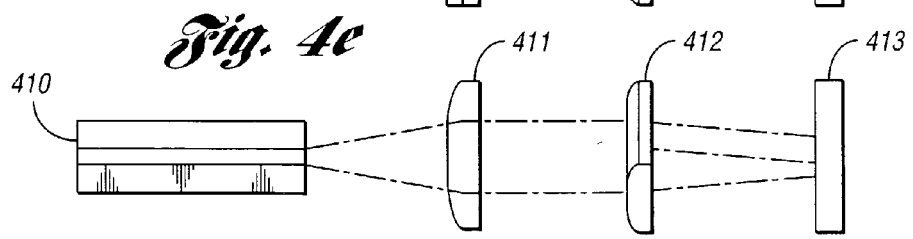
Figure 4G:
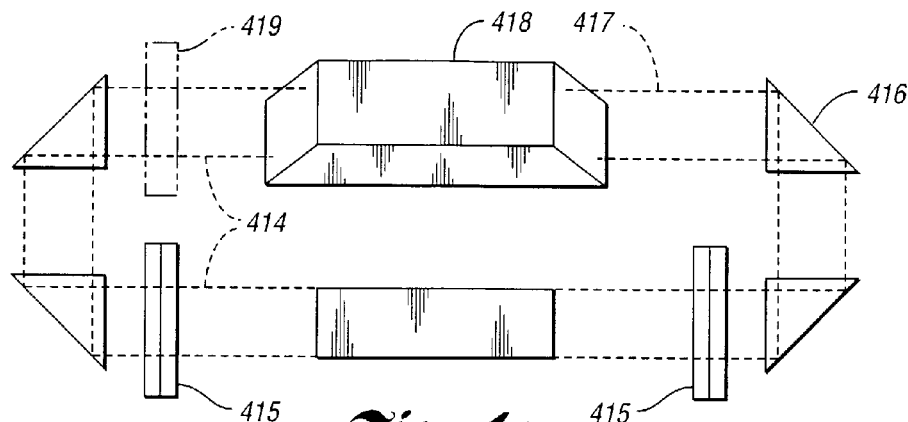
Figure 4H:
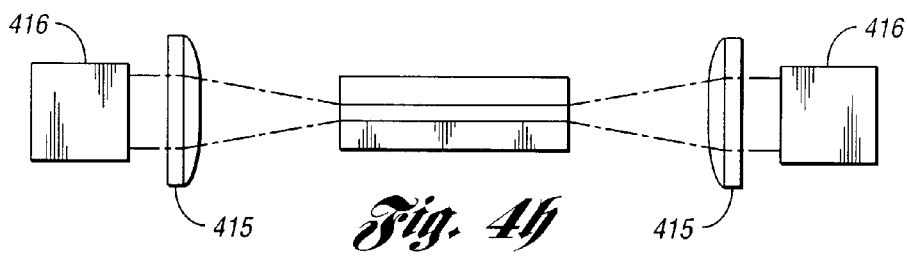

Cylindrical Lens Approach:

Referring to the top and side views shown in FIGS. 4E and 4F respectively, a single waveguide is used in a linear standing wave cavity. One end 410 of the waveguide is partially reflecting and acts as the output coupler. A cylindrical lens 411 is used to collimate the beam emitted from the other end of the waveguide to produce a beam with a round or square cross section. An additional cylindrical lens 412 with its axis oriented at 45° relative to the guided axis of the waveguide is positioned after the first cylindrical lens. A flat, highly reflecting (HR) mirror 413 is positioned at the focus of the second cylindrical lens and is adjusted to reflect the beam directly back on itself. The second cylindrical lens then re-collimates the beam and the first cylindrical lens focuses the beam back into the waveguide. Together, the second cylindrical lens and the mirror have a net effect identical to that of the Porro Prism in the previous design in that the beam is physically rotated by 90° between passes through the first cylindrical lens.

Dove Prism Approach:

Referring to the top and side views shown in FIGS. 4-G and 4-H respectively, a single waveguide is used in a traveling wave ring cavity 414. Cylindrical lenses 415 are used to collimate the beam exiting from both ends of the waveguide to produce a beam with a round or square cross section. Fold mirrors or prisms 416 are used to direct the output from one end of the waveguide back into the other end of the waveguide. In the section 417 where the beam is collimated, a dove prism 418 is inserted with its axes oriented at 45° relative to the axes of the waveguide. This physically rotates the beam by 90° between passes through the waveguide. A Faraday rotator and a ½-wave plate 419 may be also be inserted into the cavity to force unidirectional oscillation.

For all of these options, the worst case beam quality of the laser is dependent on the waveguide core thickness (t) in microns, the waveguide width (w) in mm, the waveguide NA (NA), and the focal length of the collimating lens (f) in mm. The worst case mm*mrad beam quality (diameter*full-angle divergence) will be the smaller of w*t/f or w*2*NA. Thus if NA>t/2f, the beam quality is equal to w*t/f and if NA<t/2f, the beam quality is equal to t*2*NA (the inherent beam quality of the waveguide structure). The beam quality can, of course, never be better than the fundamental mode beam quality of $4*\lambda/\pi$ where $\lambda$ is the wavelength in microns.

In the NA>t/2f case, the core of the waveguide effectively acts as a near field aperture to limit the beam diameter while the width of the waveguide acts as a far-field aperture to limit the beam divergence. The beam fills the width of the waveguide and the beam quality is not dependent on the NA of the waveguide structure. Use of any of the embodiments approximately equalizes the beam quality in the two axes and it improves the beam quality in the guided axis compared to the beam quality defined by the core size and NA of the waveguide structure itself. This allows single mode output to be produced from highly multimode waveguide structures. Multimode waveguide structures are easier to pump than single mode waveguide structures and are well suited to simple and efficient butt coupling of the pump diodes to the waveguide. If it is not convenient to let the width of the waveguide serve as the limiting aperture in the unguided direction, a separate aperture with a width a where a<w could be inserted into the resonator. In this case, the beam quality in the NA>t/2f case would be a*t/f. Such an approach may be preferred if the invention is implemented with a waveguide based on certain other embodiments taught herein, for instance planar waveguides with zigzag transverse beam paths or planar waveguides with transverse claddings which are taught in later sections.

In the case where NA<t/2f, the core of the waveguide effectively acts as a near field aperture to limit the beam diameter while the NA limits the far-field divergence. In this case, the beam may not completely fill the width of the waveguide. In this second case, use of any of the embodiments equalizes the beam quality in the two axes but it does not improve the beam quality in the guided axis compared to the beam quality defined by the core size and NA of the waveguide structure itself (t*2*NA). Producing single mode output in this case requires a single mode waveguide structure.

It is to be recognized that the swapping approach can be optionally utilized to provide transverse mode control of any of the planar waveguide devices described in embodiments taught herein.

Beam Quality Control—Gain Medium Cooling with Tailored Thermal Profile

The beam quality control techniques in the previous section are related to diffraction and mode propagation properties and the beam quality is estimated at least to first order.

With many types of lasers, and in particular with solid state lasers, achieving high beam quality and high power operation simultaneously is limited by thermal effects in the gain medium. Thermal and stress gradients produce index gradients and hence thermal lens effects. The focal length of the thermal lens is dependent upon at least the pumping power which in turn impacts the laser performance. In precision material processing systems changes in spot size or shape during a machining operation may result in deficient operation. Further, variations in focal length with power may considerably degrade the performance in micro-machining applications where the depth of focus is narrow, for instance where focused spot sizes are in the range of a few microns and wherein the irradiance on the target must be precisely controlled. Hence, design techniques to ensure beam quality and consistency over both long and short term periods is generally beneficial. As such, performance in high power laser applications like welding, soldering, or cutting may be improved.

For many types of solid state lasers, particularly side-pumped slabs, side-pumped thin-disks, and side-pumped planar waveguides, the pumping profile in the gain medium is non-uniform in an axis transverse to the direction of beam propagation, yet the gain medium cooling techniques utilized in the prior art provide relatively uniform cooling across the cooled surface of the gain medium. In such lasers, a thermal gradient in the gain medium is created in at least one axis transverse to the direction of beam propagation. This transverse thermal gradient can adversely affect laser performance.

Figure 5A:
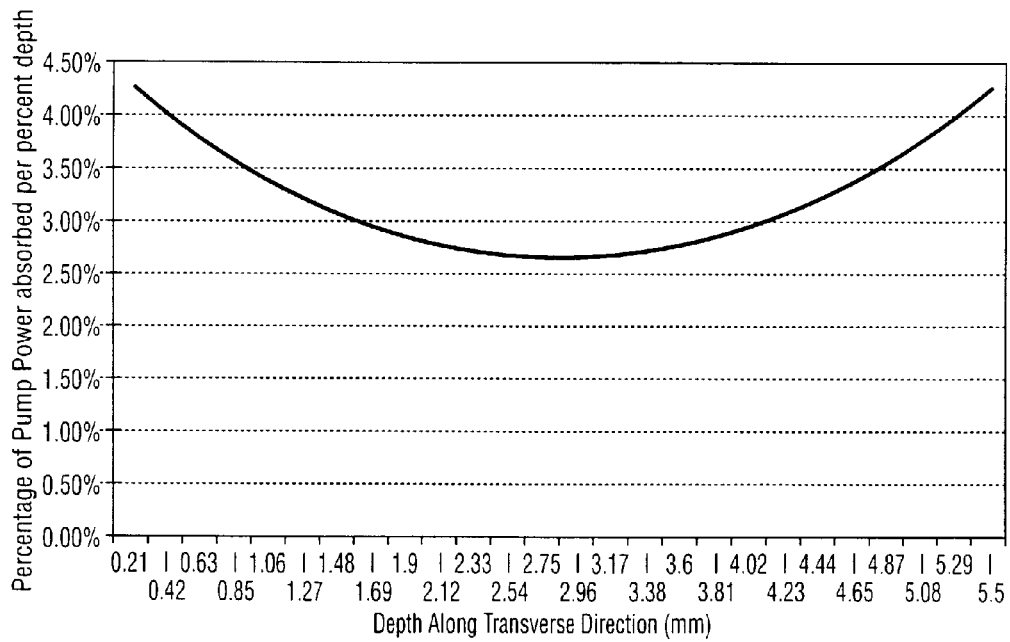
Figure 5E:
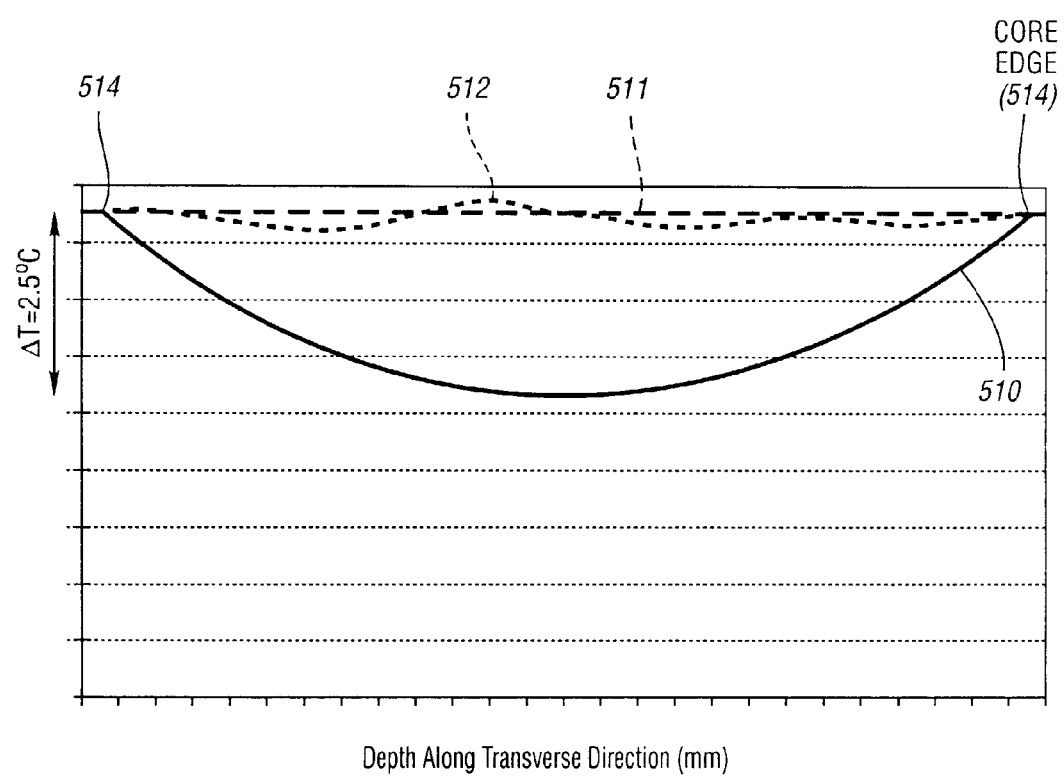

FIG. 5-A shows a transverse pumping profile of an exemplary side pumped planar waveguide. A cooling arrangement for planar waveguides is shown in the '824 patent, for instance in FIG. 12 and columns 18–19.

At least one embodiment of the present invention includes non-uniform cooling of a surface of the gain medium to compensate for a non-uniform pumping profile such that the transverse thermal gradient which would be present with uniform cooling is modified or eliminated.

The rate of heat deposition in a gain medium can be described in terms of Watts per unit volume at any given point in the gain medium. The cooling at a given point in the gain medium can be described by a thermal resistance between that point and the fluid or thermal reservoir providing the cooling. Thermal resistance is typically defined as the resulting temperature rise divided by the heat dissipated. Thermal resistance is typically measured in ° C./W. Uniform pumping in a given direction implies that the rate of heat deposition is constant when measured at different points along that direction. Uniform cooling of the gain medium in a given direction implies that the thermal resistance between the gain medium and the fluid or thermal reservoir providing the cooling is constant when measured at different points along that direction.

Many different approaches can be utilized to achieve the desired non-uniform cooling on the surface of the gain medium. A few of these approaches are listed below:

If the gain medium or a cladding attached to the gain medium is directly liquid cooled, modifying the flow rate of the cooling liquid to provide different surface flow velocities on different regions on the cooled surface can provide non-uniform cooling.

If the gain medium or a cladding attached to the gain medium is conduction cooled by direct contact with a heatsink, the heatsink can be constructed to provide non-uniform cooling. Possible heatsink designs providing non-uniform cooling include:
1. Heatsinks with insulating cavities placed to increase the thermal resistance at specific areas on the cooling surface of the heatsink.
2. Heatsinks made of multiple materials with varying thermal properties such that the thermal resistance varies across the cooling surface of the heatsink.
3. Liquid-cooled heatsinks whose internal cooling passages are strategically placed such that the thermal resistance varies across the cooling surface of the heatsink.
4. Liquid cooled heatsinks where the coolant flow rate varies between different internal cooling passages such that the thermal resistance varies across the cooling surface of the heatsink.

The steady state thermal profile in a transverse cross-section through the exemplary side-pumped device of FIG. 1 was estimated for each of three heatsink designs corresponding to FIGS. 5B–5D, with FIG. 5-B corresponding to uniform cooling.

With the design of FIG. 5-B (uniform cooling) a peak-peak temperature difference of about 2.5 deg. C. between different locations in the core of the waveguide is expected. FIG. 5-E illustrates the estimated thermal gradient 510 (core edge is shown at 514). Between the core of the waveguide 500 and the heatsink 501 is a 0.5 mm thick sapphire cladding 502. The upper side of the core is clad with a 3 mm thick sapphire cladding 503. The heatsink is a copper block with a series of cooling channels 504 through which a cooling fluid is passed. The temperature of the cooling fluid is 20° C. and the flow through each of the channels is the same.

With the design of FIG. 5-C, which provides non-uniform cooling in accordance with an embodiment of the present invention, the non-uniform cooling is optimized to nearly eliminate the thermal gradient. The peak-to-peak temperature difference between different locations in the core of the waveguide with this heatsink design is about 0.25° C. The transverse thermal gradient, 511 as illustrated in FIG. 5-E, has thus been reduced by an order of magnitude compared to the uniformly cooled case. The 5.5 mm width of the heatsink in contact with the sapphire cladding is composed of three sections. The outer 0.75 mm on each side is copper 505 and the central 4 mm is red brass 506. These three sections are each 1.5 mm thick and they sit on top of a finned copper heatsink base 507 that has a series of cooling channels through which a cooling fluid flows. The various sections of the heatsink are in thermal contact with each other and are preferably bonded together using a solder or thermally conducting adhesive. The temperature of the cooling fluid is 20° C. and the flow through each of the channels is the same.

Shown below is the steady state thermal profile in a transverse cross-section through the exemplary waveguide and its heatsink when an alternative heatsink design that also provides non-uniform cooling is shown in FIG. 5-D. The non-uniform cooling is optimized to nearly eliminate the thermal gradient. The peak-to-peak temperature difference between different locations in the core of the waveguide with this heatsink design is about 0.35° C. The transverse thermal gradient, 512 as illustrated in FIG. 5-E, has thus been reduced by nearly an order of magnitude compared to the uniformly cooled case. The heatsink is identical to that of the uniformly cooled case of FIG. 5-B except that an air-filled cavity 508 that is 4.0 mm wide and 0.5 mm high has been added to the heatsink. The cavity is approximately centered in the width of the heatsink and the top of the cavity is located 0.75 mm below the surface of the heatsink in contact with the waveguide. The temperature of the cooling fluid is 20° C. and the flow through each of the channels is the same.

In some situations, it is beneficial to produce a specific transverse thermal gradient which is non-zero and which is different from the transverse thermal gradient that would be produced if uniform cooling is applied to the gain medium. This situation occurs when a flat/flat resonator is used with a side pumped planar waveguide laser. The thermal gradients present in a side pumped planar waveguide with uniform cooling produce a weak negative thermal lens in the transverse direction. This negative thermal lens causes a flat/flat resonator to become unstable, inhibiting lasing. In order to keep the flat/flat resonator from becoming unstable, any thermal lens in the transverse direction should be slightly positive. Use of the present non-uniform cooling method allows the thermal gradients in the transverse direction of a side pumped planar waveguide laser to be modified such that they will produce a weak positive thermal lens. The weak positive thermal lens keeps the resonator stable and permits high beam quality operation with a flat/flat resonator.

The FIGS. 5B–5D and details above are shown with a basic side pumped planar waveguide format. However, the same principles could easily be adapted and applied to side-pumped slabs, side-pumped disks and other types of solid state lasers. Other variations are possible, including double-sided cooling arrangements, for example.

Beam Quality Control—Planar Waveguide with Zig-Zag Beam Path

An alternative or supplement to the non-uniform cooling approach may include the use of a zig-zag beam path to eliminate or reduce thermal effects. This alternative may also be used with non-uniform cooling to further reduce thermal effects.

In one embodiment thermal effects are approximately cancelled using a side-pumped planar waveguide with a zigzag transverse beam path. For planar waveguides pumped from both sides, the pumping profile in the gain medium is non-uniform with a quasi-parabolic profile where the pumping is strongest at the sides of the waveguide and weakest in the center of the waveguide (as shown in FIG. 5-A). If a single mode laser beam with a Gaussian transverse mode profile is passed through the waveguide on a path parallel to the sides of the waveguide, the poor match between the mode profile and the pumping profile can lead to poor efficiency and/or can degrade the transverse beam quality. The quasi-parabolic pumping profile can also produce undesirable thermal lensing effects for beams traveling parallel to the sides of the waveguide (although this lensing is much weaker than that typical of rod geometry lasers). By using a zigzag transverse beam path, the Gaussian beam can achieve better energy extraction from the highly pumped sides of the waveguide as it makes reflections off of the side surfaces of the waveguide. In addition, the zigzag transverse beam path averages any thermally induced optical effects resulting from transverse temperature gradients in the core of the waveguide.

The use of a zigzag beam path in slab lasers to cancel thermal effects and/or modify the energy extraction of gaussian beams is well known in the prior art. For example, an arrangement for a lamp pumped zigzag slab laser where the lamps are positioned adjacent to the points where the beam reflects on the cooled surfaces of the slab was patented by Kuhn, U.S. Pat. No. 4,617,669.

In zigzag slab lasers, the beam path follows a zigzag path through the laser medium making multiple reflections on the cooled faces of the slab. The zigzag path in a zigzag slab laser thus lies in a plane perpendicular to the cooled surfaces. The zigzag path used in an embodiment of the present invention (FIG. 6) differs from that used in slab lasers in that the present zigzag path lies in a plane (see FIG. 6A) which is parallel to the cooled surface(s) of the planar waveguide. In a plane perpendicular to the cooled surface(s) of the planar waveguide, the beam is guided by the core/cladding structure of the waveguide.

In a particular embodiment of the present invention, illustrated in top and side views of FIGS. 6A and 6B respectively, the pump diodes 600 on each side of the waveguide are preferentially positioned 601 along the length of the waveguide such that the light emitted by each diode is centered lengthwise on a point at which the beam path 602 makes a reflection from the side surface of the waveguide.

Polarized Planar Waveguide Laser

In some applications it is desirable to produce polarized outputs. In at least one embodiment a monolithic planar waveguide laser will produce a polarized output, preferably from a monolithic device. Without some polarization dependent loss mechanism, a planar waveguide laser will produce a randomly polarized output. Though feasible for use in a material processing system, utilizing a polarizing element separate from the waveguide structure would sacrifice the robustness of a completely monolithic preferred structure. In a monolithic design the polarizing element is to be integrated directly into the planar waveguide so that polarized output is produced from a completely monolithic structure. Preferably, the device will provide an extinction ratio of at least 100:1.

Refer to FIG. 7-A. In this embodiment the gain section provides for pump light confinement with a high N.A. and also produces a polarized output beam. A cladding 700 includes an optical material with either inherent or induced birefringence is contacted/bonded to the core of the planar waveguide over at least a portion of the length of the core 701 along the direction of beam propagation. One polarization for the guided mode will experience TIR at the core/clad interface with the birefringent cladding while the other polarization for the guided mode will not experience TIR. For the simple case where the birefringent material is a uniaxial crystal, its refractive indices should satisfy $n_o < n_{core} < n_e$ (corresponding to the ordinary index of refraction, core index, and extraordinary index of refraction) or $n_e < n_{core} < n_o$.

The birefringent cladding could be used on both sides of the core, but it is only required on one side to produce the desired effect. In most cases, it is probably easiest to use another material for the cladding 703 on the opposite side.

The choice of suitable birefringent materials is somewhat limited so the use of other cladding materials where possible permits selection of materials with superior thermal, mechanical, and/or optical properties.

Additionally, as shown in FIG. 7-B, the birefringent cladding 700 does not need to extend along the entire length of the waveguide. Pump cladding 705 also extends along the length.

Refer to FIG. 7-C. The available birefringent material may not have refractive indices ideally suited to providing the desired waveguide NA for pump light confinement and/or output spatial mode control. As such, the embodiment can be combined with providing pump light confinement and output mode control in a manner similar to the Ser. No. '214 disclosure. The waveguide has three sections with discrete claddings 705, 706, 707 for the separate functions of pump light confinement, polarizing, and output mode control respectively.

Nd:YAG and other types of doped YAG are suitable core materials. 1% doped Nd:YAG has refractive index of about 1.8216. Some materials with refractive indices suitable for use as the above described birefringent cladding for a Nd:YAG core are listed in the table below:

| Material | $n_x$ @ 1064 nm | $n_y$ @ 1064 nm | $n_z$ @ 1064 nm |
|---|---|---|---|
| KTA, Potassium Tiranyl Arsenate | 1.782 | 1.790 | 1.868 |
| KTP, Potassium Titanyl Phosphate | 1.7381 | 1.7458 | 1.8302 |
| RTA, Rubidium Titanyl Arsenate | 1.811 | 1.815 | 1.890 |
| Nd:LSB, Neodymium doped Lanthanum Scandium Borate | 1.828 | 1.8272 | 1.7486 |

In an alternative embodiment, top 708 and side 709 views which are shown in FIGS. 7D and 7E, the planar waveguide is configured to make at least one fold 710 in the transverse direction and the birefringent cladding 711 is contacted/bonded to a side face of the planar waveguide structure where the beam is reflected to create a fold. In this second embodiment if the birefringent cladding is a uniaxial crystal and the angle of incidence at the fold is $\Theta_1$, then the refractive indices of the birefringent cladding should satisfy $n_o < n_{critical} < n_e$ or $n_e < n_{critical} < n_o$ where $n_{critical} = n_{core} \cos(\Theta_1)$.

Preferably, the polarizer is integrated directly into a monolithic device which may have separate gain and polarization sections. However, the waveguide polarizer may be used to produce a polarized output beam wherein an input beam is coupled into the core with an imaging system, for example.

It is to be understood that these embodiments for producing linear polarized outputs and various other alternatives can be used provide polarized operation of any of the planar waveguide devices described herein.

Semi-Active Q-Switch—High Peak Power/Narrow Pulse

In many material processing applications, for instance cutting, drilling, trimming, and/or marking, it is desirable to produce high energy pulses with short duration. Q-switching is a well known technique for modulating the output of laser systems to produce high peak power pulses. The operation and performance of q-switched systems is well documented. For instance, LASERS, Siegman, University Science books, 1986, pp. 1028–1032 describes repetitive q-switching. Similarly, in FUNDAMENTALS OF PHOTONICS, Saleh & Teich, Wiley, 1991, pp. 522–536, various methods of pulsing lasers is documented and analyzed, including the numerical estimation of q-switched pulse shapes.

Two main classes of Q-switches exist: "Active" and "Passive". The loss state of an active Q-switch is controlled electronically whereas the loss state of a passive Q-switch is not. Active Q-switching utilizes devices that can be electrically switched between states. The most common types of active Q-switches are acousto-optic (AO) and electro-optic (EO). Such Q-switches are commercially available from a number of vendors. In material processing systems external control and synchronization of laser firing, for instance with a computer coupled to a beam positioner, is often desirable if not necessary. Various methods can be used to control the Q-switched pulse characteristics with varying repetition rate, for instance as taught in U.S. Pat. No. 6,339,604 entitled "Pulse Control in Laser Systems" which is assigned to the assignee of the present invention.

It is desirable to provide at least a semi-active Q-switching method and system that can be applied to virtually any laser source. In at least one embodiment a semi-active q-switch may be integrated with a diode-pumped planar waveguide structure to produce a compact, preferably monolithic, device. The high gain and relatively short cavity length permit the generation of very short Q-switched pulses with pulse widths on the order of a few nanoseconds, for example.

Waveguide lasers typically have cross-sectional areas much smaller than conventional lasers using bulk gain media such as laser rods or slabs. This small cross-sectional area results in very high gain devices because the pump light is confined to a small guiding region. However, Q-switching planar waveguide lasers can be difficult because the Q-switch loss must be very high in order to hold-off lasing in spite of the high gain.

In one embodiment of a laser processing system having a waveguide laser or amplifier an external q-switch may be used. However, using an external Q-switch with a waveguide laser requires coupling the beam into and out of the waveguide. Use of a Q-switch that is integrated into the waveguide structure is a simpler and preferred solution for this architecture.

Existing active Q-switches are not easily adapted to a waveguide form. Passive Q-switches have been integrated into planar waveguide lasers. Maxios Laser Corporation has produced devices that incorporate a stripe of a saturable absorber material directly into the structure of the waveguide. Further, the '824 patent to Maxios describes details of a passive q-switch in a passive waveguide structure (col. 11, lines 1–15). This simple approach allows construction of monolithic, passively Q-switched waveguide lasers, but these lack the active control required in many applications. However, a need exists for a technique of actively Q-switching planar waveguide lasers using a device that is integrated into the waveguide.

In accordance with at least one embodiment of the present invention, "semi-active Q-switching" of a laser is provided by using a light source other than emission from the gain medium to help bleach a saturable absorber Q-switch. This technique combines the simplicity and reliability of a passive Q-switch with the controllability of an active Q-switch. The primary intended use of this technique is for Q-switching of solid-state, planar waveguide lasers, but the general technique can be used with virtually any type of laser. For example, FIG. 8-A is a schematic perspective view of a semi-active q-switch applied to the basic waveguide laser of FIG. 1.

A preferred embodiment of the semi-active Q-switch is shown in FIG. 8-A. This embodiment is a monolithic diode-pumped Q-switched planar waveguide laser. In this embodiment of the present invention, a portion of the core of a planar waveguide laser is replaced by a section of a solid state saturable absorber material 800 such that this "stripe" of saturable absorber material spans the entire width of the core but only occupies a portion of the length of the core as shown. For a planar waveguide laser with a core of Nd:YAG or Yb:YAG, $Cr^{4+}$:YAG is a suitable saturable absorber. A laser diode 802 is used as the secondary light source and its output is coupled into the core of the planar waveguide so that it will be absorbed by the saturable absorber stripe. The secondary laser diode can be coupled into the core of the waveguide via either the side or the end of the waveguide. The output wavelength of the secondary laser diode is within the absorption band of the saturable absorber but preferably different from the wavelength of the primary laser and preferably not highly absorbed by the laser gain medium. The output of the secondary laser diode is incident on the saturable absorber stripe in the region through which the primary laser beam passes. The initial absorption of the saturable absorber is chosen so that with the secondary light source turned off, the primary laser will be below threshold with the maximum desired amount of stored energy in the gain medium. The maximum output power of the secondary laser diode is chosen such that it can excite a sufficient number of ions in the saturable absorber to reduce the loss of the saturable absorber to the point where threshold of the primary laser is reached with the minimum desired amount of stored energy in the gain medium. An HR coating at the laser wavelength is deposited at the end of the device 803, and the end is also to be coated with an anti-reflection (AR) coating at the secondary light source wavelength. At the opposite end the output face is partially reflective at the laser wavelength 804 to function as an OC.

The present approach offers a real time technique of adjusting the unsaturated absorption loss of a saturable absorber Q-switch. Adjusting the power level and/or duty cycle of the secondary light source alters the pulse energy of the laser because it changes the loss of the saturable absorber and thus changes the amount of stored energy in the gain medium necessary to achieve the threshold condition. Increasing the power level and/or duty cycle of the secondary light source reduces the laser's pulse energy and decreasing the power level or duty cycle of the secondary light source increases the laser's pulse energy.

In a preferred embodiment laser diodes are used as the secondary light source. Laser diodes are probably the best choice for the secondary light source but other light sources could be used. Laser diodes are efficient and reliable, they are available with adequate output powers, and they have the ability to be modulated at high speed. Saturable absorber Q-switch materials typically have an absorption bandwidth that is much wider than the emission bandwidth of the laser being Q-switched. This provides the opportunity to choose the diode laser wavelength such that it is within the absorption band of the saturable absorber but different from the wavelength of the primary laser. Keeping the secondary diode laser wavelength different from the primary laser wavelength would avoid the possibility of having the output from the diode laser stimulate lasing or amplified spontaneous emission in the primary laser gain medium. For example, for a 1064 nm Nd:YAG laser using a $Cr^{4+}$:YAG saturable absorber Q-switch, a 940 nm or 980 nm laser diode could be used to help bleach the saturable absorber without risking stimulating output from the Nd:YAG crystal and without risking providing additional pumping of the Nd:YAG crystal.

When the semi-active q-switch is used with CW pumping, the pulse energy can be adjusted such that the repetition rate can be varied while maintaining a constant average output power. This permits use of the full average output power of the laser for varying applications that need different repetition rates. Further, capability is provided to synchronize the laser output pulses to an external clock by pulsing the secondary light source to trigger the emission of the output pulse (e.g., control signal 220 of FIG. 3).

The semi-active q-switch can also be used with a pulse-pumped laser, wherein a separate control signal is used to pulse the pump diodes, for instance as shown in U.S. Pat. No. 5,854,805. The secondary light source can be pulsed at or near the end of the pump pulse to trigger emission of an output pulse. Pulsing the secondary light source in this manner offers precise control of the timing of the output pulse while the output pulse energy can be independently adjusted by adjusting the energy of the pump pulse. The semi-active Q-switching provided by the present invention permits active control of the pulse energy, pulse timing, repetition rate, and average power.

In some cases, when high pulse energies are to be produced, it may be beneficial to limit the N.A. used for confining pump light. For instance, the pump cladding may be undoped YAG with an N.A. of about 0.01–0.04 for pump light confinement. As a result, parasitic oscillations and ASE may be reduced.

It is worth noting that the cost of an appropriate laser diode, diode driver, and saturable absorber can be as little as ⅓ of the cost of a typical AO or EO Q-switch.

Variations of the active q-switch may be implemented with other guided structures, for instance a cylindrical waveguide (e.g. fiber optic).

Details of yet another embodiment for q-switching in a waveguide device are disclosed in a section below wherein a waveguide modulator is used.

Waveguide Modulator—Options for Switching, Mode and/or Polarization Control

In previous embodiments detailed herein and, in Ser. No. '214, various options for mode control, polarization control, and pulse generation are disclosed.

In at least one embodiment of a material processing system constructed in accordance with the present invention, a waveguide modulator (e.g. 207 or 227 of FIG. 2) may be used for pulse generation and/or shaping, producing a polarized output, or output mode control. In at least one embodiment various functions may be combined. Preferably, the transmission and/or NA of the optical waveguides will be electronically controlled. In a least on embodiment both the core and at least one cladding are both electro-optic materials. A monolithic structure is most preferred.

It is to be recognized that such a modulator may also be used for many applications. A waveguide modulator has a variety of applications in lasers and communications. Exemplary applications include:

An active q-switch in a laser system to modify the round trip loss in response to an electrical signal.
A variable attenuator to control the intensity of a laser beam or other optical signal.
A modulator to impose a data stream or a desired waveform onto a CW or pulsed optical signal.
An On/Off optical switch.
A mode control element in a laser.
A polarizing element.

The modulator may be used with a planar waveguide laser. Alternatively, the modulator may be used to modify a pulsed or CW laser input beam generated with a rod, semiconductor diode, fiber laser, or various other laser sources.

Refer to FIG. 9-A. In a first embodiment, an electro-optic waveguide with transverse electrodes is formed by building a sandwich of three layers 901,902,903 of an electro-optic material such as Lithium Niobate, $LiNbO_3$. The thickness of the central core layer 902 is typically in the range of 5–200 microns. The outer cladding layers 901,903 have a typical thickness in the range of 5–50 microns. The width and length of the device are application dependent. All three layers have their crystal optical axis 925 (the +z axis) parallel to the direction of propagation in the waveguide. The outer two layers have their +x and +y crystal axes oriented in the same direction. The +x and +y crystal axes of the central layer are rotated 180° about the +z axis relative to the outer two layers. Electrodes are created on the top and bottom surfaces of the structure 904 by coating them with an electrically conducting coating or by contacting electrically conducting materials to these surfaces.

When no voltage 905 is applied, all three layers have identical refractive indices so there is no reflection at the core/clad interface and no waveguide exists. If a voltage 905 of the proper polarity is applied to the electrodes, the electro-optic effect will cause the refractive index of the core to increase and the refractive index of the claddings to decrease creating a waveguide. For simplicity of discussion, the orientation of the waveguide will be chosen such that a positive voltage increases the index of the core.

With low applied voltages, the propagation loss for the lowest order mode will be dependent on the voltage. If the voltage is high enough, the refractive index difference will be large enough to allow propagation of the lowest order mode with low loss. If the voltage is increased further, the waveguide will propagate multiple modes.

The device can be configured to be either polarization dependent or polarization independent by choice of the orientation of the +x and +y axes of the layers. If the +x or +y axis of the layers is aligned perpendicular to the plane of the core as shown in FIG. 9-A, the device will be polarization sensitive. Only the polarization that is aligned perpendicular to the plane of the core will see an index difference when the voltage is applied. The polarization aligned parallel to the core will not see any index change and will never be guided. Only TM modes will be guided in this configuration. The configuration of FIG. 9-A can be adapted to provide a Q-switch in a laser where polarized output is desired.

If the +x and +y axes are aligned at 45° relative to the plane of the core as shown in FIG. 9-B, both polarizations will see an equal index change due to the applied voltage so the device will be polarization insensitive.

For the polarization insensitive case of FIG. 9-B, the refractive index difference, $\Delta n$ is related to the applied voltage according to the relation $\Delta n = n_o^3 r_{22} V/d$ where $n_o$ is the ordinary refractive index of the electro-optic material, $r_{22}$ is the linear electro-optic coefficient, and d is the distance between electrodes. The waveguide numerical aperture, NA is determined by the refractive index difference according to the relation: $NA = (\sqrt{(n_o + \Delta n/2)^2 - (n_o - \Delta n/2)^2}) = \sqrt{2 n_o \Delta n}$. The maximum NA for a symmetric single mode planar waveguide is defined by the equation: $NA_{max} = \lambda/2t$ where t is the core thickness and $\lambda$ is the wavelength. The maximum $\Delta n$ for single mode propagation in a symmetric planar waveguide is thus $\Delta n_{max}=\lambda^2/8n_o t^2$. The maximum voltage for single mode propagation in a symmetric planar waveguide is thus $V_{max}=\lambda^2 d/8n_o^4 r_{22} t^2$. For LiNbO$_3$, $n_o=2.237$ @1064 nm and $r_{22}=5.61\times10^{-6}$ µm/V. For a 50 µm thick core surrounded by 10 µm thick claddings, the cutoff voltage for single mode propagation is about $V_{max}=28.2V$. For the polarization sensitive case, the index change with applied voltage is stronger by a factor of sqrt(2) so $V_{max}$ is reduced to about 20.0V.

The device can alternatively be constructed with only two layers of electro-optic material as shown in FIG. 9-C. In this case, one of the claddings 906 is replaced by a passive optical material with a refractive index less than that of the core. In this case, the waveguide is asymmetric. Discussion of symmetric and asymmetric waveguides structures and mode propagation characteristics can be found in FUNDAMENTALS OF PHOTONICS, Saleh & Teich, Wiley, 1991, Chapter 7, pp. 238–258. Asymmetric waveguides have slightly different mode cutoff condition than symmetric waveguides. Symmetric waveguides will always propagate the lowest order mode. The mode diameter simply increases as the index difference between the core and clad is reduced to zero. Asymmetric waveguides have a cutoff condition for the lowest order mode. If the index difference between the core and cladding falls below a minimum value, even the fundamental mode is unguided. If the guide is highly asymmetric, then the minimum NA required to propagate even the lowest order mode is defined by NA=$\lambda/4t$. At NA=$3\lambda/4t$, the next higher order mode will propagate. The asymmetric waveguide is single mode for $\lambda/4t<NA<\lambda/4t$. The use of an asymmetric waveguide with the present invention may be particularly beneficial for some applications because it may offer higher losses in the "Off" state.

It should be understood that the above discussion has been based on using LiNbO$_3$ as the EO material for these devices. Other EO materials could also be used but some modification of the crystal axes may be required to account for different crystal symmetries and not all EO materials may be suitable for a polarization independent device. KTP, KTA, RTP, and RTA all have much higher nonlinear optical coefficients and their use might reduce the voltage requirements compared to LiNbO$_3$.

Refer to FIG. 9-D. In yet another embodiment a waveguide may be adapted for use as a q-switch in a laser system since its loss can be electronically controlled, and is particularly well suited for use as a Q-switch for a solid-state planar waveguide laser. When the voltage is off, the loss will be high and lasing will be inhibited. When the voltage is high enough, the loss will be low and an output pulse will be emitted. The EO waveguide 910 could be simply butt-coupled to the core 913 of a planar waveguide gain medium of an equivalent core thickness, forming a device having a gain section and modulator section. Alternatively, the modulator may be coupled to the gain medium with an imaging system. The waveguide gain medium may have sapphire claddings 912 and a Nd:YAG core 913. The adjacent faces 917 of the EO waveguide and the gain medium waveguide would be AR coated. HR and OC coatings could be applied to the outer ends of the EO waveguide 915 and the gain medium 916 respectively. In addition to serving as the Q-switch, the EO waveguide could act as a mode control device to control the beam quality of the planar waveguide laser in the guided direction. This would permit the gain medium waveguide to have a very high NA, for instance an N.A. in the range of 0.05–0.5, which is advantageous for providing good pump light confinement as taught in copending Ser. No. '214. Hence a simple and accurate technique is provided for creating the low NA waveguide required for controlling the output mode of the planar waveguide laser.

If a polarization dependent EO waveguide is used in this manner, for instance as illustrated in FIG. 9-A, the EO waveguide will also serve as a polarizing element and the output from the planar waveguide laser will be polarized. Polarized output with high beam quality is very desirable and may justify the use of the EO waveguide in planar waveguide lasers even when Q-switching is not necessary.

The disclosed EO waveguides are also well suited for use as high-speed external modulators for modulating laser beams. Currently, high-speed modulators are primarily based on Pockels cells or Mach-Zender interferometers. Pockels cells typically require a drive voltage of several kV, which presents difficulties when high-speed modulation is desired. Mach-Zender modulators require voltages less than 30V and can be very high speed but they have limited extinction ratios and are only readily available at a few select telecom wavelengths. An asymmetric EO waveguide modulator should be well suited to high-speed modulation and may achieve higher extinction ratios than Mach-Zender modulators. A high-speed modulator at 1064 nm for modulating the output from the master oscillator in MOPA laser systems could be very useful for intensity control and pulse shaping, but such modulators are not currently available. A low delay modulator with sub-nanosecond rise time, for instance about 500 ps from 10%–90%, is preferred with an extinction ratio of at least 100:1 most preferred. High-speed modulators are also critical components in telecom systems.

The disclosed EO waveguides can also be used as variable attenuators. Variable attenuators are also key telecom components.

High Gain MOPA Waveguide Configuration—Suppressed ASE and/or Parasitic Oscillations As mentioned earlier q-switched or MOPA configurations are alternatives for generating a laser output pulse in at least one embodiment of a material processing system of the present invention. In either case high gains are present in the lasing medium, and the maximum amplifier gain may limited by ASE (amplified spontaneous emission) and/or parasitic oscillations (which become significant a high small signal gain values). Careful attention so as to reduce or minimize these adverse effects will provide for higher gain. In particular, planar waveguide and fiber (e.g. cylindrical waveguide) amplifiers offer high signal gain as a result of using a gain medium with a small volume. As a result, a potentially very high figure of merit may be obtained when methods for ASE and parasitic suppression are used with waveguide devices. For instance, a monolithic waveguide amplifier may be used to amplify short pulses or ultra short pulses, for example pulses in the range of several femtoseconds to nanoseconds (e.g 10 ps–30 ns), which may improve the material processing results by reducing thermal diffusion effects.

In one embodiment particularly adapted for a MOPA configuration, a planar waveguide amplifier is provided with additional claddings in the transverse direction. In a preferred embodiment of FIG. 10A the high gain device is used to amplify seed laser input 1008. The composite core of the planar waveguide device 1000 is composed of three sections: a central core section doped with the active lasing ion 1001, and two side cladding sections 1002 which are not doped with the active lasing ion. These two side claddings have a refractive index that is preferably higher than or equal to that of the core. The refractive index of the core is higher than that of the upper and lower claddings 1003. The two side claddings are preferably transmitting at the pump wavelength and absorbing at the laser wavelength.

The purpose of these side claddings is to reduce ASE and inhibit parasitic oscillations and to facilitate multi-pass pumping. The presence of the side claddings helps to reduce the gain seen by light traveling on paths that exit the sides of the central core. Even though light on such paths will still be guided through the waveguide formed by the side cladding and upper/lower claddings, there is no gain while the light is in the side sections of the composite core. The reduced gain for these paths helps to minimize ASE. If the side sections 1002 of the core are made of a material that is absorbing at the laser wavelength, this effect will be even stronger because light on these paths through the core will experience absorption losses in the side sections of the composite core.

When side pumped 1004 (one set of pump diodes shown in FIG. 10-A), the pump diodes may be butt-coupled to the sides of the composite core. The pump light will be guided through the side claddings by TIR at the interface between the side claddings and the upper/lower claddings. Once the pump light enters the central section of the core, it will continue to be guided within the core by TIR at the interface between the central section of the core and the upper/lower claddings.

An additional benefit of the composite core of this embodiment is that it enables the use of multi-pass pumping arrangements generally shown in FIGS. 10-B through 10-E. FIGS. 10B–10D correspond to top, end, and side views 1005,1006,1007 respectively. A seed beam 1010, for instance an output of a semiconductor diode or q-switched microlaser (as in FIG. 2) is delivered to the core region 1011, which may be about 700 µm wide (corresponding to the unguided direction in FIG. 10-B). When used as a double pass amplifier, an HR coating 10111 at the opposite end may be optimized at the seed laser wavelength and pump wavelength 808 nm. The amplified beam will then exist along the optical axis at the input surface where seed beam 1010 is coupled. In a single pass amplified embodiment the surface at the opposite end will be AR coated at the seed laser wavelength for an OC, and HR coated at the pump wavelength. In this example the 808 nm pump beam 10101 is injected at an angle, about 40 degrees relative to the optical axis. The core may be 1.1% doped Nd:YAG.

In the orthogonal view of FIG. 10-D, the core 1011 may be about 50 µm in dimension and surrounded by undoped YAG cladding 1012. The absorption length may be chosen to be about 29 times the core width for the 20 mm device length. The angle may be about 89 degrees so the structure is slightly canted. The outer surfaces of the cladding may be ground.

In the end view 1006 typical dimensions are shown in millimeters: 21.0 mm width 1040, 4.05 mm height 1041, and 2.0 mm from lower edge to core center 1042.

By polishing angled faces on the ends 1015 of the side claddings, or a "V"-groove 1016 into the side of the structure, the pump light 1017 can be coupled into the composite core at an angle relative to the optical axis as shown in FIG. 10-E. If the core is relatively thin in the transverse direction, less than a few millimeters, the pump light will be only partially absorbed on the first pass through the central core. The remaining pump light will continue propagating through the composite core making multiple reflections from the side surfaces of the structure in a zigzag manner. If the angle of incidence on these side surfaces is above the critical angle, the reflections will be nearly lossless. If the waveguide structure is long enough, the pump light will eventually be completely absorbed after multiple passes through the central core.

This type of multi-pass pumping arrangement would not be practical without the transverse composite core because the angled faces 1015 or "V"-groove(s) 1016 reduce the "clear aperture" as viewed from the end of the core. With the composite core, the width of the doped central core is made equal to or narrower than the clear aperture. Without a composite core, much of the pump light in this type of multi-pass pumping arrangement would be absorbed by portions of the core which are outside the clear aperture and the pump power absorbed in those areas would be wasted.

The multi-pass pumping arrangement allows the width of the core to be much narrower than for a single-pass side pumped arrangement. A narrower transverse width permits higher gain for a given core thickness and pump power. Multi-pass pumping arrangements are also beneficial in that they are relatively insensitive to changes in the rate of absorption of the pump light by the core because the pump light will continue to make passes through the core until it is absorbed. The absorption rate is dependent on the peak wavelength and bandwidth of the pump diodes and these factors can vary from diode to diode, with temperature, and with the age of the pump diodes.

Some additional variations of multi-pass pumping arrangements are also shown in FIG. 10-E. Exemplary specifications include a core dimension 1020 of about 25 µm×600 µm, about 1 degree cant of the claddings, absorption length of about 16–17 times the core width, with the number of passes illustrated for different choices of polished angle faces 1015 and beam incident angles. Various multi-pass pumping methods are known in the art, for instance as described in U.S. Pat. Nos. 5,048,044 and 5,854,865, the latter showing a V-groove arrangement for side pumping of fibers.

In an alternative embodiment shown in FIG. 10-F, the side claddings 1030 do not serve as part of a composite core. Instead, the side claddings are simply bulk material that is contacted/bonded to the sides of the waveguide formed by the core 1001 and the upper/lower claddings 1032. This embodiment is best suited to end pumping. With this embodiment it is not possible to butt-couple pump diodes 1004 directly to the sides of the core. When side pumped, the pump light must be imaged into the sides of the core using some form of relay lens system. The outer side surfaces of the side claddings could be shaped so that they act as a cylindrical lens and help to image the pump light into the core. Alternatively, modifications of the compact optical system of FIG. 11-C may be used, wherein rod/fiber lenses are utilized. A benefit of this embodiment in terms of ASE reduction and suppression of parasitic oscillations is that light on paths which exit from the sides of the core is not guided once it enters the side sections. This results in a high loss for light on such paths.

Nd:YAG is the preferred material for the active core. The upper and lower claddings 1032 may be undoped YAG or sapphire. Sapphire upper and lower claddings create a high NA waveguide which permits simple butt coupling of the pump diodes but which may produce multimode output. Undoped YAG upper and lower claddings result in a lower NA waveguide so a thicker core may be used while maintaining single mode operation. The low NA resulting from undoped YAG claddings is not compatible with butt coupling the pump diodes because the highly divergent emission from the diodes would not be guided by the core. The diode output must be collimated to reduce its divergence prior to coupling it into the core when undoped YAG claddings are used. The low NA provided by undoped YAG claddings helps to reduce ASE and parasitic oscillations so undoped YAG claddings are preferred when very high gains are required.

$Cr^{4+}$:YAG can be used for the side claddings if the device is end-pumped. It has strong absorption at the laser wavelength, has an appropriate refractive index, and can be diffusion bonded to the central Nd:YAG core section. $Cr^{4+}$:YAG would not be a good choice if the device is to be side pumped because is absorbing at the pump wavelength. Yb:YAG is transparent at the 808 nm wavelength commonly used to pump Nd:YAG so it could be used for the side claddings with a Nd:YAG central core section. Yb:YAG, however, is relatively transparent at the 1064 nm Nd:YAG lasing wavelength. Yb:YAG has been used as the side claddings of a component fabricated for an experimental system.

When Samarium is doped into glass, it has absorption at 1064 nm but not at 808 nm. Sm:YAG might be an ideal material for these side claddings when Nd:YAG is used as the central core section. Sm:YAG is not readily available but it has been grown by Scientific Materials. It has no absorption at 808 nm. At 1064 nm, 1% atomic Sm:YAG has an absorption of $0.15/cm^{-1}$. Two strong absorption peaks exist in Sm:YAG at 1065.9 nm and at 1068 nm. The absorption of these peaks in 0.5% atomic Sm:YAG is $0.5/cm^{-1}$ and $1.6/cm^{-1}$ respectively. Scientific Materials believes it may be possible to compositionally tune Sm:YAG to shift one of the absorption peaks to 1064 nm by using a co-dopant and that Sm doping levels as high as 5% atomic should be feasible. Through these two techniques, it may be possible to achieve absorption in the range of $2-5/cm^{-1}$ in specially engineered Sm:YAG. This would make it an ideal material for the side claddings of the present invention. Sm:YAG with these properties would be an ideal material for ASE/parasitic suppression in other laser designs as well and we might want to consider protecting this concept independently. There appear to be no other materials which can be readily diffusion bonded to YAG which are transparent at 808 nm and absorbing at 1064 nm. The Sm:YAG grown by SMI was not used for this purpose. It was used as an intra-cavity filter to try to suppress lasing at 1064 nm in Nd:YAG so that lasing at the weaker 946 nm transition would dominate. Another source exists for one other Samarium Doped crystal, Samarium Gadolinium Garnet (SGG), but at this time, its optical and physical properties are unknown. According to Onyx Optics, it should be possible to bond most other types of Garnet to Nd:YAG as long as the thermal expansion coefficients are not too dissimilar.

Alternatively, the structures could be composed of glass materials instead of a single crystal material such as YAG. The core could be an Nd:doped glass such as Kigre QX/Nd. The upper and lower claddings would be an undoped glass with a similar coefficient of thermal expansion and a slightly lower refractive index. The side claddings would be a Sm:doped glass with a refractive index slightly higher than that of the core. Because the gain in Nd:doped glasses is much lower than in Nd:YAG, this type of glass structure might be preferred when a lower gain is acceptable but a higher amount of stored energy is required. Such glass structures might be well suited to CW operation and could be fabricated by drawing the waveguide from a preform using standard fiber production techniques.

It is to be recognized that the embodiments using the transverse cladding to achieve improved performance at high gain, particularly in MOPA arrangements, may be used in combination with numerous other functions and improvements taught herein.

Face Pumping Architecture

The conventional pumping scheme for solid state waveguides is side pumping from the edge orthogonal to the lasing direction as shown in several embodiments herein, or, alternatively, from the end. FIG. 11-a shows schematic end and perspective views of a waveguide laser illustrating a prior art side pumping scheme for pumping from two sides. Planar waveguide devices may also be face pumped. FIG. 11-b is a schematic view of a waveguide laser illustrating such a prior art face pumping geometry. Pump laser diodes 1100 are mounted to heatsink 1101. Slotted reflector 1102 is used to redirect energy escaping from the waveguide back into the cladding section 1103 (which may be undoped YAG) and core 1105 (which may be doped Nd:YAG or Yb:YAG). Opposite reflector 1104 is used to redirect pump energy escaping, and is attached to heatsink 1106 which is one component used for thermal management of the high power system.

An architecture that provides an efficient and power scalable face pumping geometry for a waveguide laser that will give an even pump distribution within the waveguide is desirable.

An improved architecture for face pumping is schematically shown in FIG. 11-D. A shaped bottom reflector 1110 is included with added cylindrical microlens collimating optics 1111 in front of pump laser diode bars 1112. FIG. 11-C shows an enlarged, side schematic view, partially broken away of the lens system 1111 with slotted reflector 1102. The positioning and quality of the collimating microlenses are not stringent (as in the case for coupling into the waveguide when side pumping). As can be seen from the side schematic view of FIG. 11-D, the shaped bottom reflector now confines the pump light within the waveguide and there is no longer any significant loss due to the pump light interacting with the sides of the waveguide. The sides of the waveguide can also now be canted in order to suppress amplified spontaneous emission (ASE) within the waveguide. The apex angle of the bottom reflector can be optimized in order to reduce pump light interaction with the top reflector's injection slots. In other words, the apex angle $\phi$ can be optimized for a given diode spacing and width and thickness of the waveguide. The bottom reflector 1110 could be curved cylindrically to produce confinement of the diode pump light. Furthermore, the upper reflector 1114 could be curved or angled.

FIG. 11-E is a schematic diagram illustrating a method of constructing a device. The heatsunk diode array 1100 is fabricated using conventional techniques. An array of rod/fiber lenses 1120 can be aligned with the individual laser diode emitters in order to partially collimated the diode pump light. This array of lenses can either be attached to the diode package or the waveguide structure. The waveguide structure is fabricated by diffusion bonding or optically contacting the individual layers of precision polished materials. For a waveguide structure, the refractive index of the active core has to be larger than that of the cladding. Once the waveguide structure has been fabricated, the ends and inverted roof-top structure are polished. The roof-top will be polished using conventional prism fabrication technology. High reflectivity (HR) 1121 coatings at the pump light wavelength are then fabricated onto the waveguide structure. These coatings are put onto the inverted roof-top surface. On the side opposite the inverted roof-top surface, a slotted HR coating 1122 is fabricated where the width of the slots are optimized to minimize their size but also have sufficient pump light transmission. The slots are fabricated by masking the surface prior to coating. The slotted reflector could also be a separate interface plate between the waveguide and the pump diode array. Pump light HR coatings could also be applied to the end faces of the waveguide to further enhance the pump light confinement within the waveguide structure. All pump light HR coatings may be of lower reflectivity at the active lasing wavelength, useful for ASE suppression. The heatsink 1123 can be made from any solid heat conductor (e.g. metal or ceramic) which can be cooled via microchannel heat coolers or conventional fluid channel cooling. The entire structure can then be held together using either clamping techniques with Indium (for example) interface materials or conductive epoxies. The diode heatsinks can be thermally insulated from the waveguide structure using insulating spacers 1124. The heatsink may consist of two (or more) pieces for ease of fabrication.

FIG. 11-F is a schematic view of an alternative heatsink structure with a flat base which may be more convenient.

FIG. 11-G is a schematic view of a simple waveguide laser structure with the improved pumping architecture and the heatsink structure with the flat base. The planar waveguide device, interface 1132 to the undoped YAG cladding 1103, and the angled reflector are integrated to form the structure. The simplest realization of the waveguide as a laser includes external HR mirror 1130 for confinement and partially reflective mirror 1131 for producing laser output. Additional components, for instance various embodiment with a waveguide modulator or q-switch, can be constructed based on the teachings herein.

While the best modes for carrying out the invention have been described in detail, those familiar with the art to which this invention relates will recognize various alternative designs and embodiments for practicing the invention. Further, those skilled in the art will recognize that various combinations of embodiments may be used to provide various benefits. For example, the laser mode control aspect could be utilized to provide transverse mode control of any of the planar waveguide devices described in co-pending Ser. No. '214, with the gain medium cooling embodiments, the semi-active q-switch, the zig-zag designs, high gain amplifier embodiments, and the polarized waveguide devices. It is to be recognized various methods and structures disclosed herein may also be used to improve the performance of previous devices. For example, the cooling and pumping methods may be applied to a double clad waveguide structure as described in '824 which is incorporated by reference herein.

What is claimed is:

1. A planar waveguide semi-active q-switched device for producing a laser output comprising:
   a waveguide gain section including: a core having a pump input surface, at least one output surface, and a cladding for confining pump light;
   a saturable absorber for controlling the loss of a gain medium, of the gain section the saturable absorber having a wavelength absorption band and extending along a portion of the core length;
   at least one pump diode for pumping the core; and
   a controllable radiation source for irradiating the saturable absorber material, the source having a wavelength substantially different than the laser wavelength emitted at the output surface while being at a wavelength in the absorption band of the saturable absorber.

2. A face pumped planar waveguide laser system comprising:
   a planar waveguide gain section including: a first core extending along the length of a first section and having a pump input surface for receiving pumping radiation at a pumping wavelength and further having at least one output surface for emitting a laser output beam at an output wavelength;
   an array of pump diodes for face pumping of a gain medium of the gain section;
   a heat sink in thermal contact with the array of pump diodes;
   means for collecting energy from the pump diodes and directing the energy toward a first face of a planar waveguide device; and
   a non-planar reflector for substantially confining pump energy to the waveguide device, the reflector positioned relative to a second face of the planar waveguide device, wherein the pump energy emitted from the array of pump diodes is reflected from the reflector and redirected to the gain medium of the laser.

* * * * *